US012634520B2

(12) United States Patent
Nam et al.

(10) Patent No.: US 12,634,520 B2
(45) Date of Patent: **\*May 19, 2026**

(54) IMAGE DECODING METHOD AND DEVICE IN ACCORDANCE WITH BLOCK SPLIT STRUCTURE IN IMAGE CODING SYSTEM

(71) Applicant: LG ELECTRONICS INC., Seoul (KR)

(72) Inventors: Junghak Nam, Seoul (KR); Seunghwan Kim, Seoul (KR); Hyeongmoon Jang, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

This patent is subject to a terminal disclaimer.

(21) Appl. No.: 18/789,948

(22) Filed: Jul. 31, 2024

(65) Prior Publication Data

US 2024/0388735 A1 Nov. 21, 2024

Related U.S. Application Data

(63) Continuation of application No. 17/740,284, filed on May 9, 2022, now Pat. No. 12,088,845, which is a continuation of application No. 17/183,009, filed on Feb. 23, 2021, now Pat. No. 11,356,703, which is a continuation of application No. 16/605,447, filed as application No. PCT/KR2018/003919 on Apr. 3, 2018, now Pat. No. 10,979,738.

(60) Provisional application No. 62/565,061, filed on Sep. 28, 2017.

(51) Int. Cl.
| | |
|---|---|
| *H04N 19/64* | (2014.01) |
| *H04N 19/176* | (2014.01) |
| *H04N 19/46* | (2014.01) |
| *H04N 19/96* | (2014.01) |

(52) U.S. Cl.
CPC ......... *H04N 19/647* (2014.11); *H04N 19/176* (2014.11); *H04N 19/46* (2014.11); *H04N 19/96* (2014.11)

(58) Field of Classification Search
CPC ..... H04N 19/96; H04N 19/176; H04N 19/647
See application file for complete search history.

(56) References Cited

U.S. PATENT DOCUMENTS 9,973,758 B2 * 5/2018 Puri ....................... H04N 19/59
2017/0208336 A1 * 7/2017 Li ......................... H04N 19/172

* cited by examiner

*Primary Examiner* — Zhubing Ren
(74) *Attorney, Agent, or Firm* — Bryan Cave Leighton Paisner LLP

(57) ABSTRACT

An image decoding method performed by means of a decoding device according to the present invention comprises the steps of: obtaining first split information relating to a first target block; if the first split information indicates that the first target block is to be split, splitting the first target block into first sub-blocks; obtaining MPT split information relating to a second target block which is one of the first sub-blocks of the first target block; splitting the second target block into second sub-blocks on the basis of the MPT split information; and decoding the second sub-blocks, wherein the second sub-blocks are non-square blocks.

3 Claims, 9 Drawing Sheets (b)

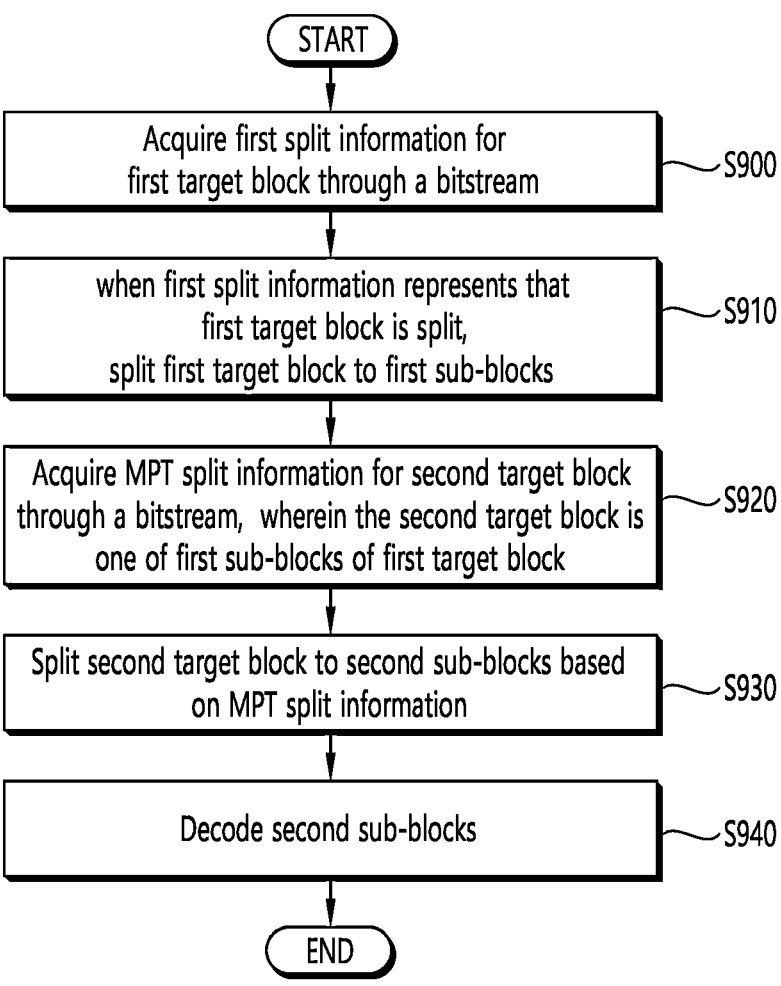

START

Acquire first split information for
first target block through a bitstream — S900 when first split information represents that
first target block is split,
split first target block to first sub-blocks — S910

Acquire MPT split information for second target block
through a bitstream, wherein the second target block is
one of first sub-blocks of first target block — S920

Split second target block to second sub-blocks based
on MPT split information — S930

Decode second sub-blocks — S940

END

IMAGE DECODING METHOD AND DEVICE IN ACCORDANCE WITH BLOCK SPLIT STRUCTURE IN IMAGE CODING SYSTEM

CROSS-REFERENCE TO RELATED APPLICATIONS

This application is a Continuation of U.S. patent application Ser. No. 17/740,284, filed May 9, 2022, which is a Continuation of U.S. patent application Ser. No. 17/183,009, filed Feb. 23, 2021, now U.S. Pat. No. 11,356,703, issued Jun. 7, 2022, which is a Continuation of U.S. patent application Ser. No. 16/605,447, filed Oct. 15, 2019, now U.S. Pat. No. 10,979,738, issued Apr. 13, 2021, which is a National Stage filing under 35U.S.C. 371 of International Application No. PCT/KR2018/003919, filed on Apr. 3, 2018, which claims the benefit of U.S. Provisional Application No. 62/565,061 filed on Sep. 28, 2017, the contents of which are all hereby incorporated by reference herein in their entirety.

BACKGROUND OF THE DISCLOSURE

Field of the Disclosure

The present disclosure relates to an image coding technique and, most particularly, to an image decoding method and device according to a block partitioning structure in an image coding system.

Related Art

Demand for high-resolution, high-quality images such as High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

Technical Objects

A technical object of the present disclosure is to provide a method and device that can enhance image coding efficiency.

Another technical object of the present disclosure is to provide a method and device that can split (or partition) a picture according to a Multiple Partitioning Tree (MPT) structure.

Yet another technical object of the present disclosure is to provide a method and device that can split (or partition) a picture to non-square blocks according to a Multiple Partitioning Tree (MPT) structure and that can perform decoding based each non-square block.

Technical Solutions

According to an exemplary embodiment of the present disclosure, provided herein is a video decoding method being performed by a decoding device. The method includes the steps of acquiring first split information for a first target block, when the first split flag represents that the first target block is split, splitting the first target block to first sub-blocks, acquiring Multiple Partitioning Tree (MPT) split information for a second target block, wherein the second target block is one of the first sub-blocks of the first target block, splitting the second target block to second sub-blocks based on the MPT split information, and decoding the second sub-blocks, wherein the second sub-blocks are non-square blocks.

According to another exemplary embodiment of the present disclosure, provided herein is a decoding device performing image decoding. The decoding device includes an entropy decoder acquiring first split information for a first target block through a bitstream and acquiring Multiple Partitioning Tree (MPT) split information for a second target block through the bitstream, wherein the second target block is one of the first sub-blocks of the first target block, a picture partitioner splitting the first target block to first sub-blocks, when the first split flag represents that the first target block is split, and splitting the second target block to second sub-blocks based on the MPT split information, and a predictor decoding the second sub-blocks, wherein the second sub-blocks are non-square blocks.

According to yet another exemplary embodiment of the present disclosure, provided herein is a video encoding method being performed by an encoding device. The method includes the steps of splitting a first target block to first sub-blocks, splitting a second target block to second sub-blocks, wherein the second target block is one of the first sub-blocks, decoding the second sub-blocks, and generating first split information for the first target block and MPT split information for the second target block and encoding and outputting the generated information, wherein the second sub-blocks are non-square blocks.

According to a further exemplary embodiment of the present disclosure, provided herein is a video encoding device. The encoding device includes a picture partitioner splitting a first target block to first sub-blocks and splitting a second target block to second sub-blocks, wherein the second target block is one of the first sub-blocks, a predictor decoding the second sub-blocks, and an entropy encoder generating first split information for the first target block and MPT split information for the second target block and encoding and outputting the generated information, wherein the second sub-blocks are non-square blocks.

Effects of the Embodiments of the Disclosure

According to the present discloure, a picture may be split (or partitioned) to diversely shaped blocks according to a Multiple Partitioning Tree (MPT) structure, and, by doing so, prediction efficiency may be enhanced, and an overall coding efficiency may be enhanced.

According to the present discloure, a picture may be split (or partitioned) to diversely shaped blocks according to a Multiple Partitioning Tree (MPT) structure, and, by doing so, transform efficiency may be enhanced, and an overall coding efficiency may be enhanced.

BRIEF DESCRIPTION OF THE DRAWINGS

FIG. 6 shows an exemplary transmission of syntaxes of the QTMPT structure for a target CU.

FIG. 9 is a general diagram of a video decoding method performed by a decoding device according to the present discloure.

DESCRIPTION OF EXEMPLARY EMBODIMENTS

Figure 1:
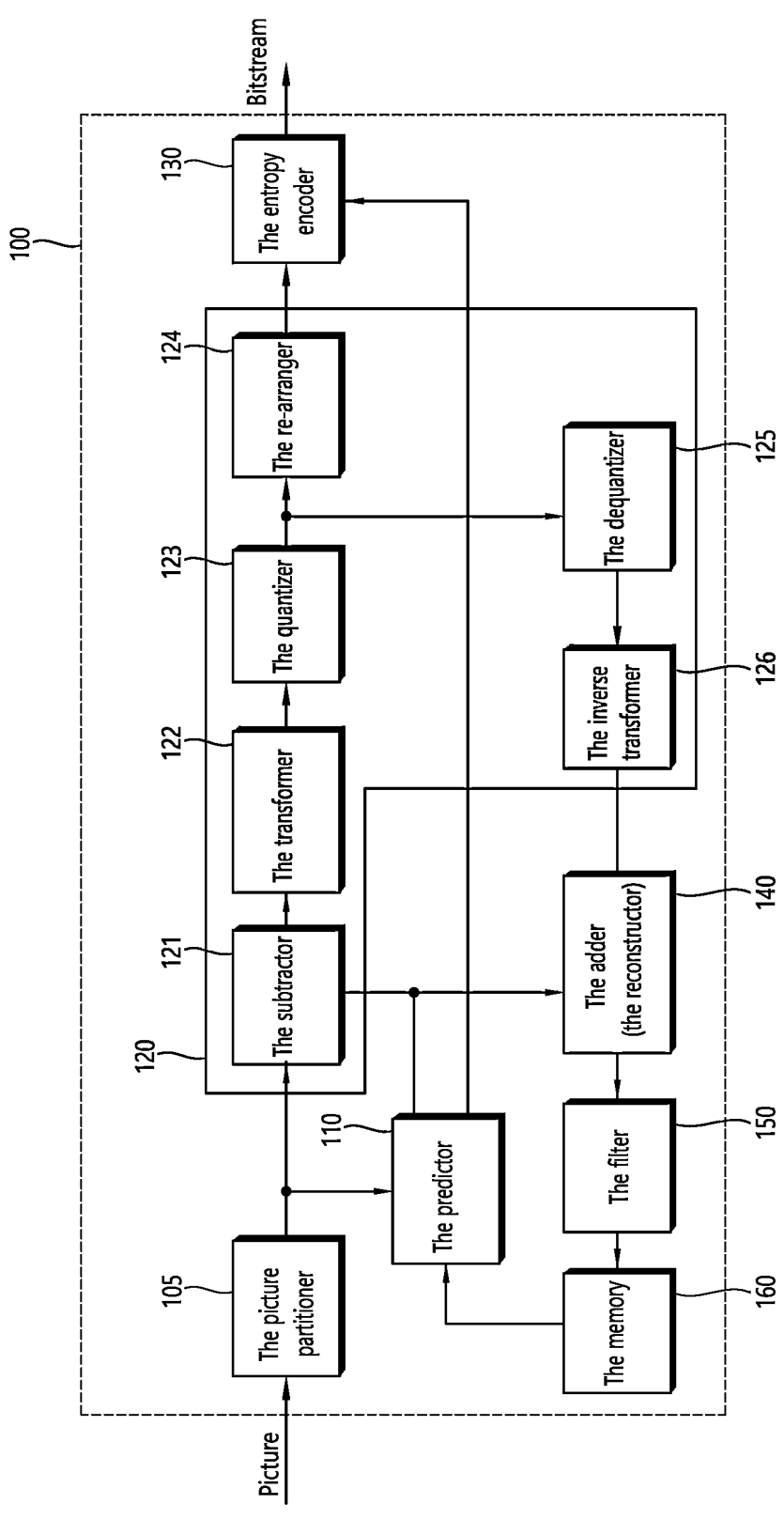
FIG. 1 is a schematic diagram illustrating a configuration of a video encoding device to which the present discloure is applicable.

The present discloure may be modified in various forms, and specific embodiments thereof will be described and illustrated in the drawings. However, the embodiments are not intended for limiting the discloure. The terms used in the following description are used to merely describe specific embodiments, but are not intended to limit the discloure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the discloure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the discloure without departing from the concept of the discloure.

Hereinafter, embodiments of the present discloure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present discloure is applicable.

Referring to FIG. 1, a video encoding device (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present discloure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
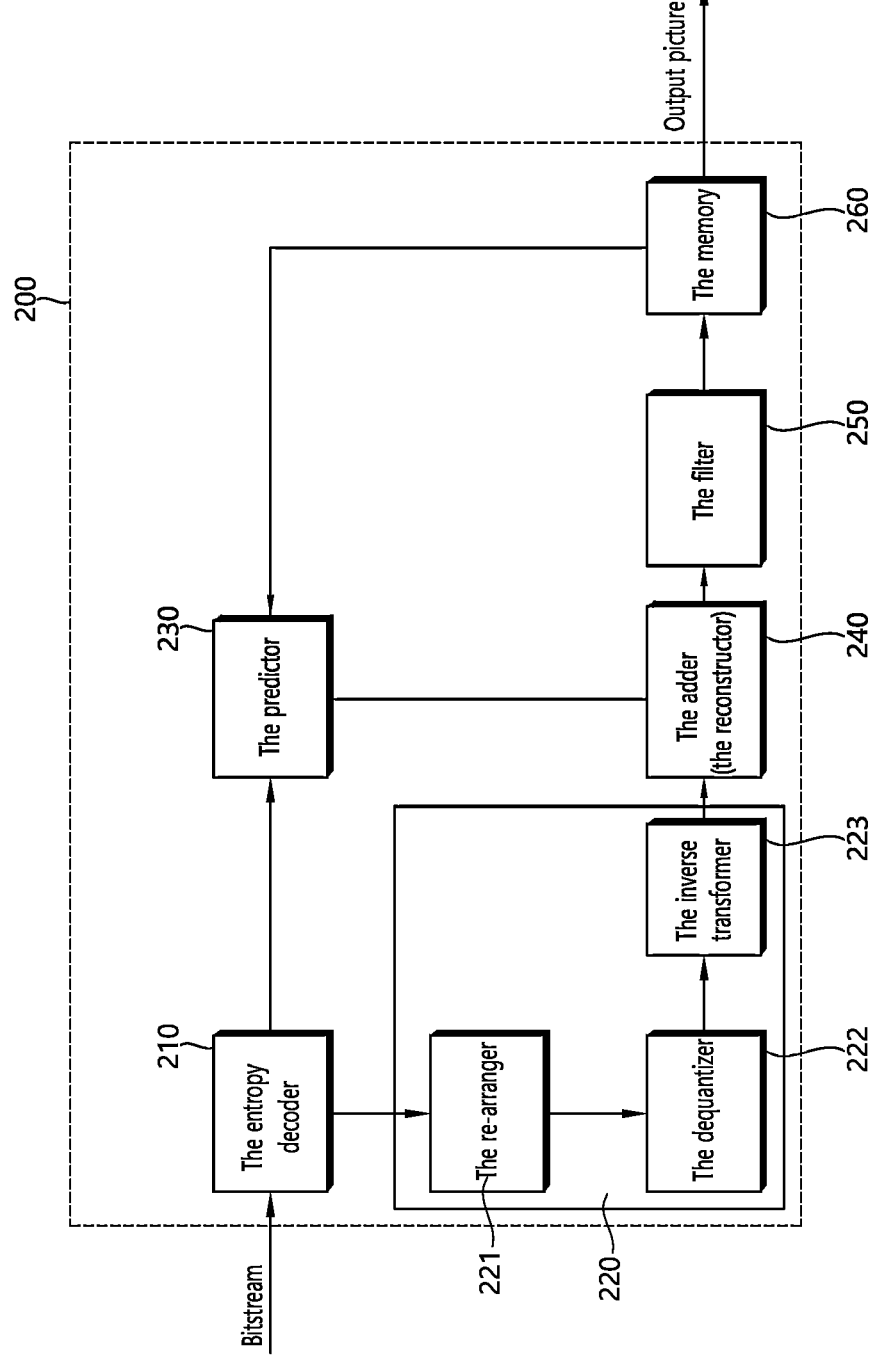
FIG. 2 is a schematic diagram illustrating a configuration of a video decoding device to which the present discloure is applicable.

FIG. 2 briefly illustrates a structure of a video decoding device to which the present disclosure is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), and an inverse transformer (223).

When a bitstream including video information is input, the video decoding device (200) may reconstruct a video in association with a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of a neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The afore-mentioned information about prediction may include a merge index indicating a candidate block having the best motion vector selected from candidate blocks included in the merge candidate list. Here, the predictor (230) may derive the motion vector of the current block using the merge index.

When the Motion vector Prediction (MVP) mode is applied as another example, a motion vector predictor can-didate list may be generated using a motion vector of a reconstructed spatial neighboring block and/or a motion vector corresponding to a Col block which is a temporal neighboring block. That is, the motion vector of the recon-structed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector differ-ence (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor (230) may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder (240) may add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block genera-tor.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adap-tive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated accord-ing to a reference picture set or a reference picture list. A reconstructed picture may be used as a reference picture for other pictures. The memory (260) may output reconstructed pictures in an output order.

In case coding is performed on an inputted picture as described above, the coding may be performed based on one processing unit. The processing unit may be indicated as a coding unit (CU). Meanwhile, as coding is performed in region units including similar information within the picture, the transform efficiency may be enhanced. And, by doing so, the overall coding efficiency may be enhanced. Additionally, as coding is performed in region units including similar information within the picture, prediction efficiency may be enhanced. And, by doing so, the overall coding efficiency may be enhanced. However, in case the picture is split (or partitioned) only to square-shaped CUs by applying only a quad tree (QT) structure, there may be limitations in per-forming splitting (or partitioning) so that the CUs can accurately include similar information. For example, infor-mation indicating a specific entity within the picture may be widely positioned along a diagonal direction. And, in this case, if the information indicating the specific entity is included by using only one CU, in addition to the informa-tion indicating the specific entity, a wider range of other information may also be included. And, if the information indicating the specific entity is included by using a plurality of square-shaped CUs, coding shall be performed on each of the plurality of CUs. Accordingly, the coding efficiency may be degraded. In this case, the coding efficiency may be more enhanced by splitting the picture to non-square CUs includ-ing the information indicating the specific entity. Accord-ingly, the present disclosure proposes a method of splitting (or partitioning) an inputted picture to square-shaped CUs and non-square CUs by using another split structure as well as the quad tree (QT) structure. By doing so, the picture may be split to diverse shapes of CUs depending upon the information included within the picture, and the coding may be performed more efficiently.

Figure 3:
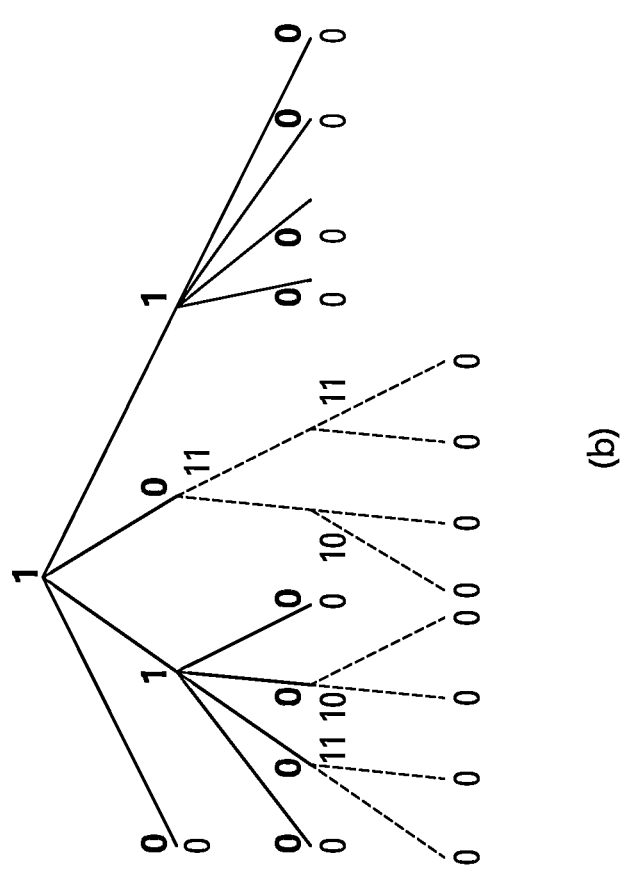
FIG. 3 shows an example of a CU being split according to a Quad Tree Binary Tree (QTBT) structure and a syntax of the QTBT structure.
Figure 3:
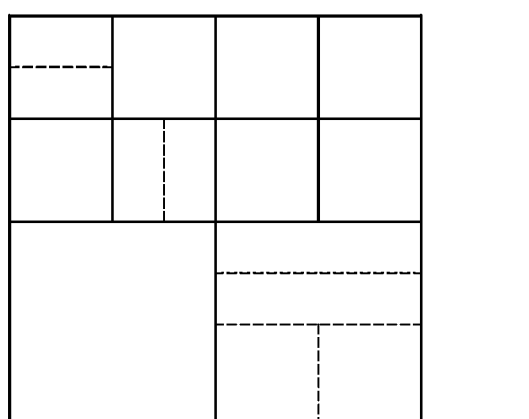

FIG. 3 shows an example of a CU being split according to a Quad Tree Binary Tree (QTBT) structure and a syntax of the QTBT structure.

The QTBT structure may indicate a structure, wherein a CU (or CTU) is split (or partitioned) according to the QT structure and then split according to a binary tree (BT) structure. More specifically, the QTBT structure may indi-cate a split structure that is configured of a combined form of the QT structure and the BT structure. Herein, in case a picture is coded in CTU units, a CTU may be split (or partitioned) according to the QT structure, and a leaf node of the QT structure may be additionally split according to the BT structure. Herein, the leaf node may indicate a CU that is no longer split in the QT structure, and the leaf node may also be referred to as a terminal node. Additionally, the QT structure may indicate a 2N×2N size CU (or CTU) being split to 4 N×N size sub-CUs, and the BT structure may indicate a 2N×2N size CU being split to 2 N×2N size sub-CUs, or 2 2N×N sub-CUs. Referring to (a) of FIG. 3, a CU may be split to lower-depth square CUs according to the QT structure, and, additionally, among the square CUs, a specific CU may be split to lower-depth non-square CUs according to the BT structure.

(b) of FIG. 3 may illustrate an exemplary transmission of a syntax of the QTBT structure. As shown in (b) of FIG. 3, a solid line may indicate the QT structure and a dotted line may indicate the BT structure. Additionally, starting from the top and progressing downwards (i.e., up-to-down direc-tion), syntaxes for CUs starting from a higher depth to a low depth may be indicated. Additionally, starting from a left-side end towards a right-side end (i.e., left-to-right direction), syntaxes for an upper left-side CU, an upper right-side CU, a lower left-side CU, and a lower right-side CU may be respectively indicated. More specifically, an index shown at a highest (or uppermost) position may indicate a syntax for an n-depth CU, and indexes shown at a second highest position may indicate syntaxes for (n+1)-depth CUs, and indexes shown at a third position from the top may indicate syntaxes for (n+2)-depth CUs, and indexes shown at a fourth position from the top may indicate syntaxes for (n+3)-depth CUs. Furthermore, indexes that are marked in bold lettering may indicate values for syntaxes corresponding to the QT structure, and indexes that are not marked in bold lettering may indicate values for syntaxes corresponding to the BT structure.

Referring to (b) of FIG. 3, a QT split flag indicating whether or not the CU is to be split (or partitioned) according to the QT structure may be transmitted. More specifically, a flag indicating whether or not a 2N×2N size CU is being split to 4 N×N size sub-CUs may be transmitted. A QT_split_flag may indicate a syntax element for the QT split flag. For example, in case the value of the QT split flag is equal to 1, the CI may be split to 4 sub-CUs. And, in case the value of the QT split flag is equal to 0, the CU may not be split. Additionally, in order to adjust the QT structure corresponding to an inputted image, information on a maximum (or largest) CU size, a minimum (or smallest) CU size, a maximum depth, and so on, within the QT structure may be transmitted. The above-described information on the QT structure may be respectively transmitted for each slice type or for each image component (luma component, chroma component, and so on).

Referring to (b) of FIG. 3, information on a BT structure may be transmitted for a terminal node that is no longer split in the QT structure. More specifically, information on the BT structure may be transmitted for a CU corresponding to the terminal node in the QT structure. Herein, information including the information on the BT structure may be referred to as MPT information. For example, a BT split flag indicating whether or not splitting (or partitioning) of the CU is carried out according to the BT structure, i.e., whether or not the BT structure for the CU is applied, may be transmitted. A BT_split_flag may indicate a syntax element for the BT split flag. More specifically, in case a value of the BT split flag is equal to 1, the CU may be split to 2 sub-CUs, and, in case the value of the BT split flag is equal to 0, the CU may not be split. Additionally, in order to adjust the BT structure corresponding to an inputted image, information on a maximum (or largest) CU size, a minimum (or smallest) CU size, a maximum depth, and so on, within the BT structure may be transmitted. The above-described information on the QT structure may be respectively transmitted for each slice type or for each image component. In case the CU is split according to the BT structure, the CU may be split along a horizontal or vertical direction. In other words, the 2N×2N size CU may be split to 2N×N size sub-CUs, or the 2N×2N size CU may be split to N×2N size sub-CUs. A BT split mode index indicating a direction along which the CU is to be split, i.e., a split type of the CU, may be transmitted. A BT_split_mode may indicate a syntax element for the BT split mode index. For example, in case the value of the BT split mode index is equal to 1, the CU may be split along a vertical (or perpendicular) direction, i.e., to N×2N size sub-CUs, and, in case the value of the BT split mode index is equal to 0, the CU may be split along a horizontal direction, i.e., to 2N×N size sub-CUs.

Figure 4:
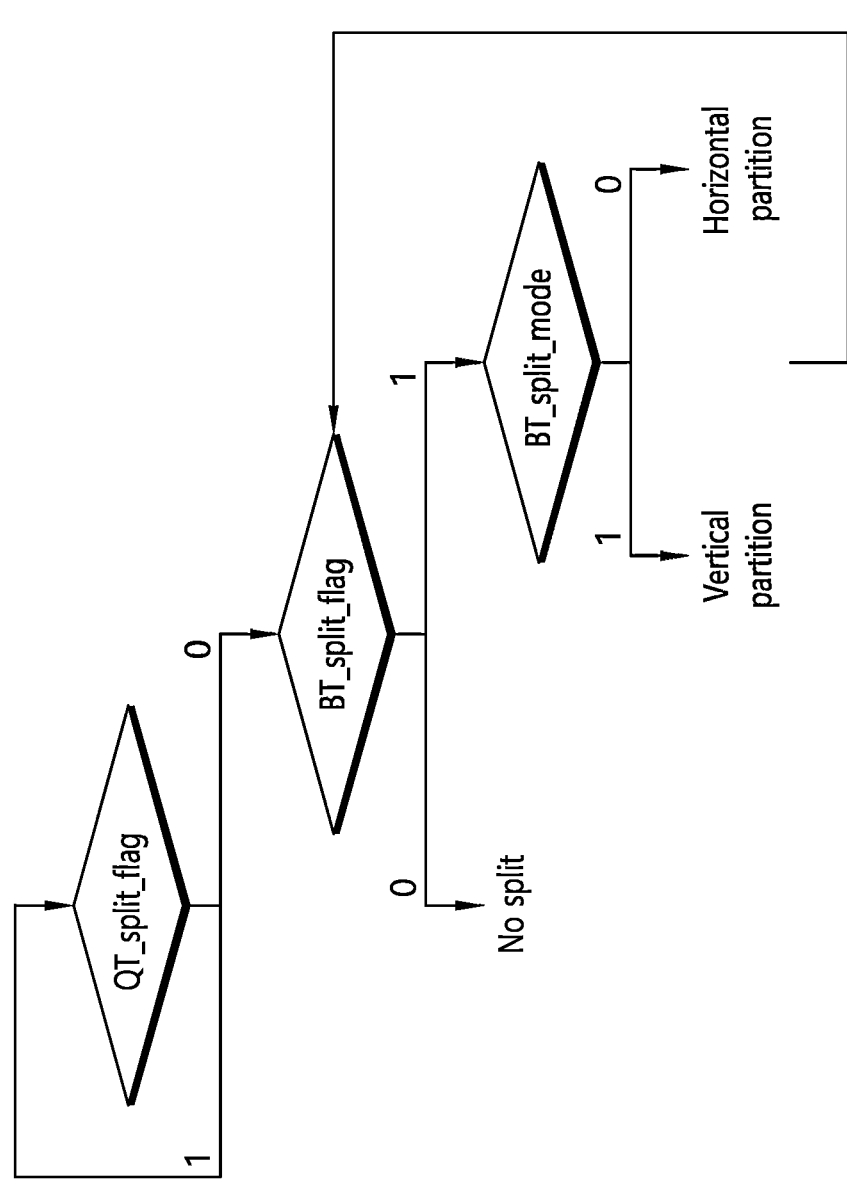
FIG. 4 shows an exemplary transmission of syntaxes of the QTBT structure for a target CU

FIG. 4 shows an exemplary transmission of syntaxes of the QTBT structure for a target CU.

Referring to FIG. 4, a QT_split_flag for a target CU may be transmitted. As described above, the QT_split_flag may indicate whether or not the target CU is split according to the QT structure. More specifically, the QT_split_flag may indicate whether or not the target CU is split to sub-CUs having sizes corresponding to a half height and a half width of the target CU.

More specifically, for example, in case the value of the QT_split_flag of the target CU is equal to 1, i.e., in case the QT_split_flag indicates that the target CU is split to sub-CUs each having a size corresponding to a half height and a half width of the target CU, the target CU may be split to the corresponding sub-CUs. In this case, the QT_split_flag corresponding to the sub-CUs may be transmitted. More specifically, the target CU may be recursively split to lower depth CUs, thereby deriving CUs of terminal nodes, which can no longer be split.

Meanwhile, in case a value of the QT_split_flag for a target CU of the terminal node is equal to 0, i.e., in case the QT_split_flag indicates that the target CU is not split to sub-CUs each having a size corresponding to a half height and a half width of the target CU, a BT_split_flag corresponding to the target CU may be transmitted. As described above, the BT_split_flag may indicate whether or not the target CU is split according to the BT structure. More specifically, for example, the BT_split_flag whether or not the 2N×2N size target CU is split to N×2N size sub-CUs or 2N×N size sub-CUs. In case the BT structure is applied to the target CU, the shapes of the CUs being split from the target CU may be determined in accordance with the BT_split_flag and BT_split_mode values.

More specifically, in case the value of the BT_split_flag is equal to 1, the target CU may be split to the N×2N size sub-CUs or 2N×N size sub-CUs, and, in case the value of the BT split flag is equal to 0, the target CU may not be split. And, in case the BT_split_flag indicates that the target CU is split according to the BT structure, a BT_split_mode for the target CU may be transmitted. The BT_split_mode may indicate a direction along which the CU is to be split, i.e., a split type of the CU. For example, in case the value of the BT_split_mode is equal to 1, the CU may be split along a vertical (or perpendicular) direction, i.e., to N×2N size sub-CUs, and, in case the value of the BT_split_mode is equal to 0, the CU may be split along a horizontal direction, i.e., to 2N×N size sub-CUs.

Additionally, the syntaxes of the QTBT structure may be indicated as shown below in the following table.

TABLE 1

| | Descriptor |
|---|---|
| coding quadtree ( x0, y0, log2CbSize, cqtDepth ) { | |
|   QT_split_flag[ x0 ][ y0 ] | ae(v) |
|   if( QT split flag[ x0 ][ y0 ] ) { | |
|     x1 = x0 + ( 1 << ( log2CbSize − 1 ) ) | |

TABLE 1-continued

```
    y1 = y0 + ( 1 << ( log2CbSize − 1 ) )
    coding quadtree( x0, y0, log2CbSize − 1, cqtDepth + 1 )
    if( x1 < pic width in luma samples )
        coding quadtree ( x1, y0, log2CbSize − 1, cqtDepth + 1 )
    if( y1 < pic height in luma samples )
        coding quadtree ( x0, y1, log2CbSize − 1, cqtDepth + 1 )
    if( x1 < pic width in luma samples && y1 < pic height in luma samples )
        coding quadtree ( x1, y1, log2CbSize − 1, cqtDepth + 1 )
  } else {
    coding_binarytree( x1, y1, log2CbSize, log2CbSize )
  }
}
```

| | Descriptor |
|---|---|
| coding_binarytree ( x0, y0, log2CbSize, log2CbSize ) {<br>  BT_split_flag[ x0 ][ y0 ] | ae(v) |
|   if (BT_split_flag[ x0 ][ y0 ] ) {<br>    BT_split_mode[x0][y0] | ae(v) |
|     if( PartMode == PART_2NxN) {<br>      coding_binarytree ( x0, y0, log2CbSize, log2CbSize − 1 )<br>      coding_binarytree ( x0, y0 + (1 << ( log2CbSize − 1 )), log2CbSize, log2CbSize − 1)<br>    } else { /* PART_Nx2N */<br>      coding_binarytree ( x0, y0, log2CbSize − 1, log2CbSize)<br>      coding_binarytree ( x0 + (1 << ( log2CbSize − 1 )), y0, log2CbSize − 1, log2CbSize)<br>    }<br>  } else {<br>    coding_unit ( x0, y0, log2CbSize, log2CbSize )<br>  }<br>} | |

Herein, QT_split_flag may indicate a syntax element of the above-described QT split flag, BT_split_flag may indicate a syntax element of the above-described BT split flag, and BT_split_mode may indicate a syntax element of the above-described BT split mode index.

The CU may be split, and a leaf node of the QT structure may be additionally split according to the MPT structure.

According to the above-described QTBT structure, the 2N×2N size target CU, which corresponds to the leaf node of the QT structure, may be split to 2 N×2N size sub-CUs or may be split to 2 2N×N size sub-CUs. However, as shown in (a) to (j) of FIG. 5, the target CU, which corresponds to the leaf node of the QT structure, may be split to 2, 3, or 4 diversely shaped sub-CUs. More specifically, the MPT structure may represent a structure, wherein the target CU is split to a plurality of diversely shaped non-square sub-CUs.

Figure 5:
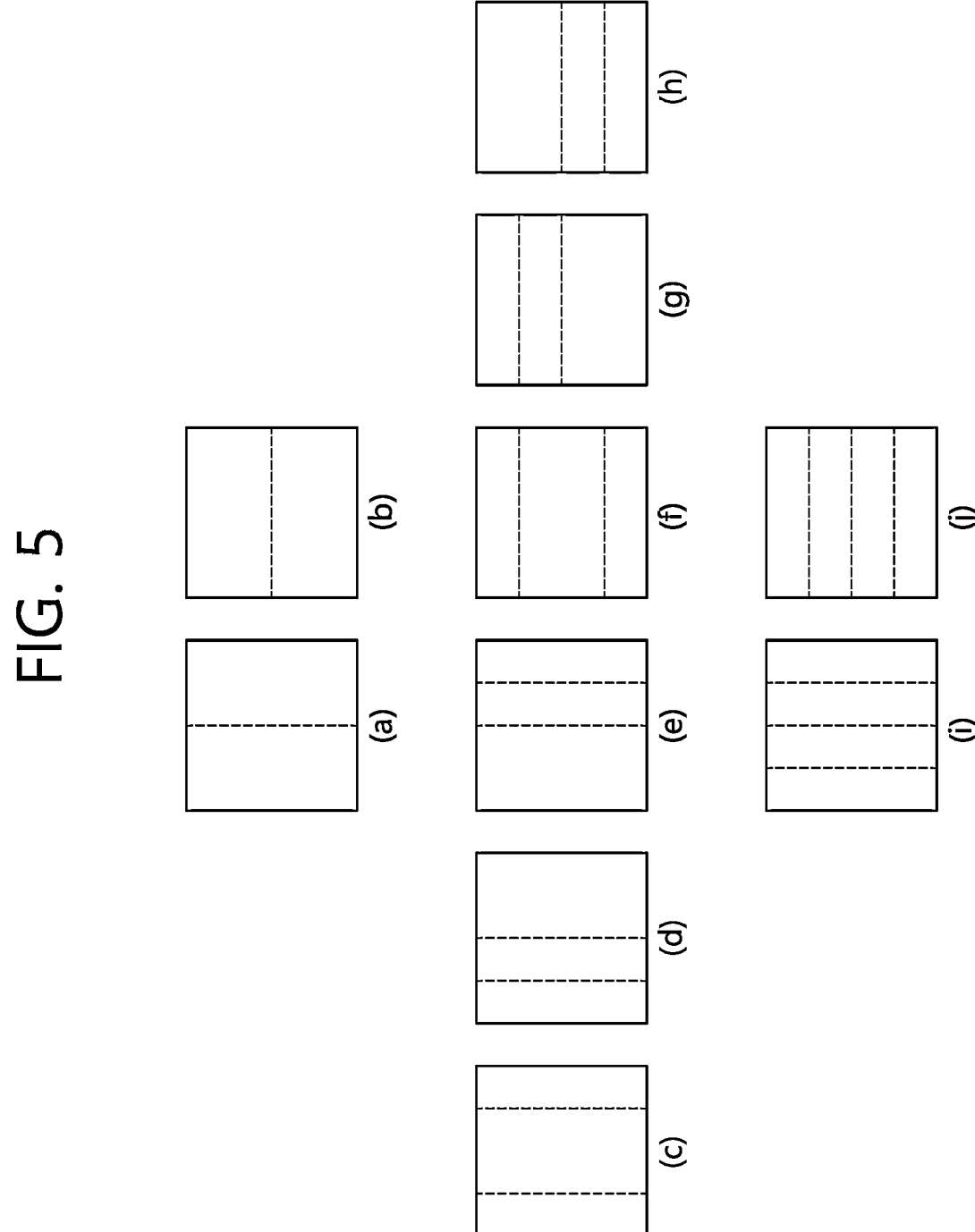
FIG. 5 shows an example of a target CU being split according to the QTMPT structure.

More specifically, referring to (a) and (b) of FIG. 5, the target CU may be split to 2 sub-CUs along a vertical direction or a horizontal direction according to the MPT structure. More specifically, the 2N×2N size target CU may be split to 2 N×2N size sub-CUs or may besplit to 2 2N×N size sub-CUs according to the MPT structure.

Additionally, referring to (c) to (h) of FIG. 5, the target CU may be split to 3 sub-CUs along a vertical direction or a horizontal direction according to the MPT structure. In case the target CU is split to 3 sub-CUS, the target CU may be split to one large-sized sub-CU and 2 small-sized sub-CUs, or the target CU may be equally split to 3 sub-CUs, i.e., the target CU may be split to 3 equal sized sub-CUs. The solution for splitting the target CU to one large-sized sub-CU and 2 small-sized sub-CUs may include diverse splitting (or partitioning) methods depending upon the position of the large-sized sub-CU.

For example, as shown in (c) of FIG. 5, the 2N×2N size target CU may be split to one N/2×2N size sub-CU, one N×2N sub-CU, and one N/2×2N sub-CU according to the MPT structure. As shown in (c) of FIG. 5, the 2N×2N size target CU may be split according to the MPT structure from left to right in an order of one N/2×2N size sub-CU, one N×2N sub-CU, and one N/2×2N sub-CU.

Alternatively, for example, as shown in (d) of FIG. 5, the 2N×2N size target CU may be split to one N/2×2N size sub-CU, one N/2×2N sub-CU, and one N×2N sub-CU according to the MPT structure. More specifically, as shown in (d) of FIG. 5, the 2N×2N size target CU may be split according to the MPT structure from left to right in an order of one N/2×2N size sub-CU, one N/2×2N sub-CU, and one N×2N sub-CU.

Alternatively, for example, as shown in (e) of FIG. 5, the 2N×2N size target CU may be split to one N×2N size sub-CU, one N/2×2N sub-CU, and one N/2×2N sub-CU according to the MPT structure. More specifically, as shown in (c) of FIG. 5, the 2N×2N size target CU may be split according to the MPT structure from left to right in an order of one N×2N size sub-CU, one N/2×2N sub-CU, and one N/2×2N sub-CU.

Alternatively, for example, as shown in (f) of FIG. 5, the 2N×2N size target CU may be split to one 2N×N/2 size sub-CU, one 2N×N sub-CU, and one 2N×N/2 sub-CU according to the MPT structure. More specifically, as shown in (f) of FIG. 5, the 2N×2N size target CU may be split according to the MPT structure from up to down in an order of one 2N×N/2 size sub-CU, one 2N×N sub-CU, and one 2N×N/2 sub-CU.

Alternatively, for example, as shown in (g) of FIG. 5, the 2N×2N size target CU may be split to one 2N×N/2 size sub-CU, one 2N×N/2 sub-CU, and one 2N×N sub-CU according to the MPT structure. More specifically, as shown in (g) of FIG. 5, the 2N×2N size target CU may be split according to the MPT structure from up to down in an order of one 2N×N/2 size sub-CU, one 2N×N/2 sub-CU, and one 2N×N sub-CU.

Alternatively, for example, as shown in (h) of FIG. 5, the 2N×2N size target CU may be split to one 2N×N size sub-CU, one 2N×N/2 sub-CU, and one 2N×N/2 sub-CU according to the MPT structure. More specifically, as shown in (h) of FIG. 5, the 2N×2N size target CU may be split according to the MPT structure from up to down in an order of one 2N×N size sub-CU, one 2N×N/2 sub-CU, and one 2N×N/2 sub-CU.

Alternatively, for example, as shown in (i) and (j) of FIG. 5, the 2N×2N size target CU may be split to 4 sub-CUs along a vertical direction or a horizontal direction according to the MPT structure. More specifically, the 2N×2N size target CU may be split to 4 N/2×2N size sub-CUs or may be split to 4 2N×N/2 size sub-CUs. Meanwhile, if the splitting according to the BT structure is recursively applied to the target CU and the sub-CUs of the target CU, splitting may be carried out as shown in (i) or (j) of FIG. 5. However, in the MPT structure, the target CU may be split to 4 sub-CUs through a single splitting process without any repetition of the splitting process.

Meanwhile, in order to adjust the MPT structure corresponding to an inputted image, information on a maximum (or largest) CU size, a minimum (or smallest) CU size, a maximum depth, and so on, within the MPT structure may be transmitted. The above-described information on the MPT structure may be respectively transmitted for each slice type or for each image component (luma component, chroma component, and so on). Alternatively, the above-described information on the MPT structure may be respectively transmitted through a Sequence Parameter Set (SPS), a Picture Parameter Set (PPS), or a slice segment header.

Figure 6:
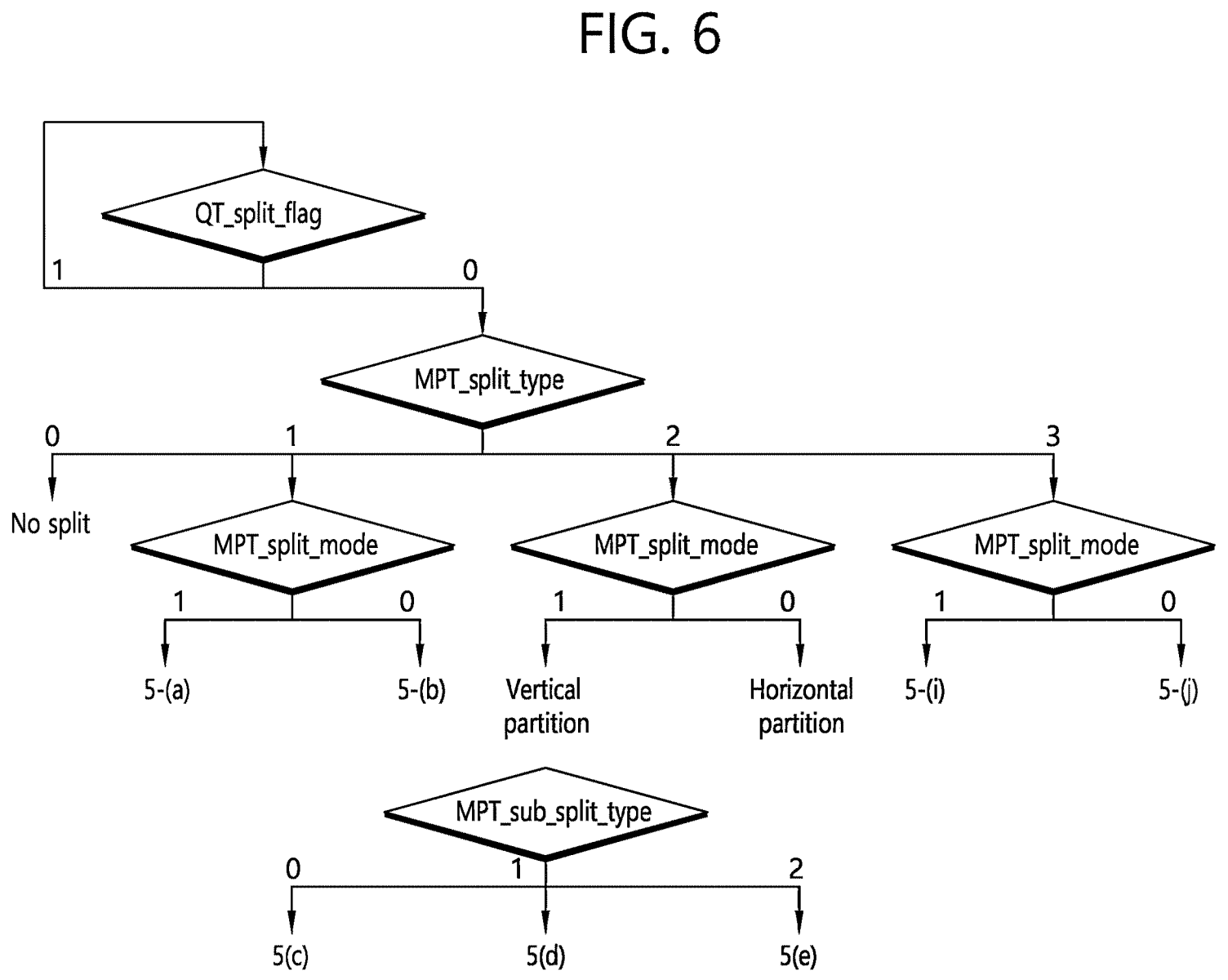

FIG. 6 shows an exemplary transmission of syntaxes of the QTMPT structure for a target CU.

Referring to FIG. 6, a QT_split_flag for a target CU may be transmitted. As described above, the QT_split_flag may indicate whether or not the target CU is split according to the QT structure. More specifically, the QT_split_flag may indicate whether or not the target CU is split to sub-CUs having sizes corresponding to a half height and a half width of the target CU.

More specifically, for example, in case the value of the QT_split_flag of the target CU is equal to 1, i.e., in case the QT_split_flag indicates that the target CU is split to sub-CUs each having a size corresponding to a half height and a half width of the target CU, the target CU may be split to the corresponding sub-CUs. In this case, the QT_split_flag corresponding to the sub-CUs may be transmitted. More specifically, the target CU may be recursively split to lower depth CUs, thereby deriving CUs of terminal nodes, which can no longer be split.

Meanwhile, in case a value of the QT_split_flag for a target CU of the terminal node is equal to 0, i.e., in case the QT_split_flag indicates that the target CU is not split to sub-CUs each having a size corresponding to a half height and a half width of the target CU, information on the MPT structure corresponding to a target CU of the terminal node may be transmitted. Herein, information including the information on the MPT structure may be referred to as MPT split information. For example, the MPT split information may include MPT split type information corresponding to the target CU. More specifically, in case the value of the QT_split_flag corresponding to a target CU of the terminal node is equal to 0, an MPT_split_type for the target CU may be transmitted. The MPT_split_type may indicate a syntax for the MPT split type information. The MPT_split_type may, for example, indicate whether or not the 2N×2N size target CU is split to a plurality of diversely shaped non-square sub-CUs. The non-square sub-CUs may include N/2×2N size sub-CUs, N×2N size sub-CUs, 2N×N/2 size sub-CUs, and/or 2N×N size sub-CUs.

More specifically, for example, in case the value of the MPT_split_type of the target CU is equal to 0, the target CU may not be split. Additionally, in case the value of the MPT_split_type of the target CU is not equal to 0, the shapes of the sub-CUs being split from the target CU may be determined in accordance with MPT_split_type and MPT_split_mode. More specifically, the MPT split information may include MPT split type information and MPT split direction information corresponding to the target CU. Herein, the MPT_split_type may indicate a syntax corresponding to the MPT split type information, and the MPT_split_mode may indicate a syntax corresponding to the MPT split direction information.

For example, in case the value of the MPT_split_type is equal to 1, the target CU may be split to 2 sub-CUs. More specifically, in case the value of the MPT_split_type is equal to 1 and the value of the MPT_split_mode is equal to 1, the target CU may be split to 2 N×2N size sub-CUs, as shown in the above-described (a) of FIG. 5. Additionally, in case the value of the MPT_split_type is equal to 1 and the value of the MPT_split_mode is equal to 0, the target CU may be split to 2 2N×N size sub-CUs, as shown in the above-described (b) of FIG. 5.

Additionally, for example, in case the value of the MPT_split_type is equal to 2, the target CU may be split to 3 sub-CUs. Additionally, in case the value of the MPT_split_type is equal to 2 and the value of the MPT_split_mode is equal to 1, the target CU may be split to 3 sub-CUs along the vertical direction. Additionally, in case the value of the MPT_split_type is equal to 2 and the value of the MPT_split_mode is equal to 0, the target CU may be split to 3 sub-CUs along the horizontal direction. In case the split direction of the target CU is derived based on the MPT_split_type, MPT_sub_split_type corresponding to the target CU may be transmitted, and the MPT_sub_split_type may indicate sub split information of the target CU. The MPT split information may include MPT sub split type information corresponding to the target CU. And, herein, the MPT_sub_split_type may indicate a syntax for the MPT sub split type information.

More specifically, in case the target CU is split to 3 sub-CUs, sub split information of the target CU may be derived based on the MPT_sub_split_type.

More specifically, in case the value of the MPT_split_type is equal to 2 and the value of the MPT_split_mode is equal to 1 and the MPT_sub_split_type is equal to 0, the target CU may be split to one N/2×2N size left-side sub-CU, one N×2N size center sub-CU, and one N/2×2N size right-side sub-CU, as shown in the above-described (c) of FIG. 5. Additionally, in case the value of the MPT_split_type is equal to 2 and the value of the MPT_split_mode is equal to 1 and the MPT_sub_split_type is equal to 1, the target CU may be split to one N/2×2N size left-side sub-CU, one N/2×2N size center sub-CU, and one N×2N size right-side sub-CU, as shown in the above-described (d) of FIG. 5. Additionally, in case the value of the MPT_split_type is equal to 2 and the value of the MPT_split_mode is equal to 1 and the MPT_sub_split_type is equal to 2, the target CU may be split to one N×2N size left-side sub-CU, one N/2×2N size center sub-CU, and one N/2×2N size right-side sub-CU, as shown in the above-described (c) of FIG. 5. Additionally, in case the value of the MPT_split_type is equal to 2 and the value of the MPT_split_mode is equal to 0 and the MPT_sub_split_type is equal to 0, the target CU may be split to one 2N×N/2 size upper-side sub-CU, one 2N×N size center sub-CU, and one 2N×N/2 size lower-side sub-CU, as shown in the above-described (f) of FIG. 5. Additionally, in case the value of the MPT_split_type is equal to 2 and the value of the MPT_split_mode is equal to 0 and the MPT_sub_split_type is equal to 1, the target CU may be split to one 2N×N/2 size upper-side sub-CU, one 2N×N/2 size center sub-CU, and one 2N×N size lower-side sub-CU, as shown in the above-described (g) of FIG. 5. Additionally, in case the value of the MPT_split_type is equal to 2 and the value of the MPT_split_mode is equal to 0 and the MPT_sub_split_type is equal to 2, the target CU may be split to one 2N×N size upper-side sub-CU, one 2N×N/2 size center sub-CU, and one 2N×N/2 size lower-side sub-CU, as shown in the above-described (h) of FIG. 5.

Furthermore, for example, in case the value of the MPT_split_type is equal to 3, the target CU may be split to 4 sub-CUs. More specifically, in case the value of the MPT_split_type is equal to 3 and the value of the MPT_split_mode is equal to 1, the target CU may be split to 4 N/2×2N size sub-CUs, as shown in the above-described (i) of FIG. 5. Additionally, in case the value of the MPT_split_type is equal to 3 and the value of the MPT_split_mode is equal to 0, the target CU may be split to 4 2N×N/2 size sub-CUs, as shown in the above-described (j) of FIG. 5.

Meanwhile, although the syntaxes of the QTMPT structure may be transmitted as described above, an exemplary transmission of syntaxes of another QTMPT structure may be proposed as described below.

Figure 7:
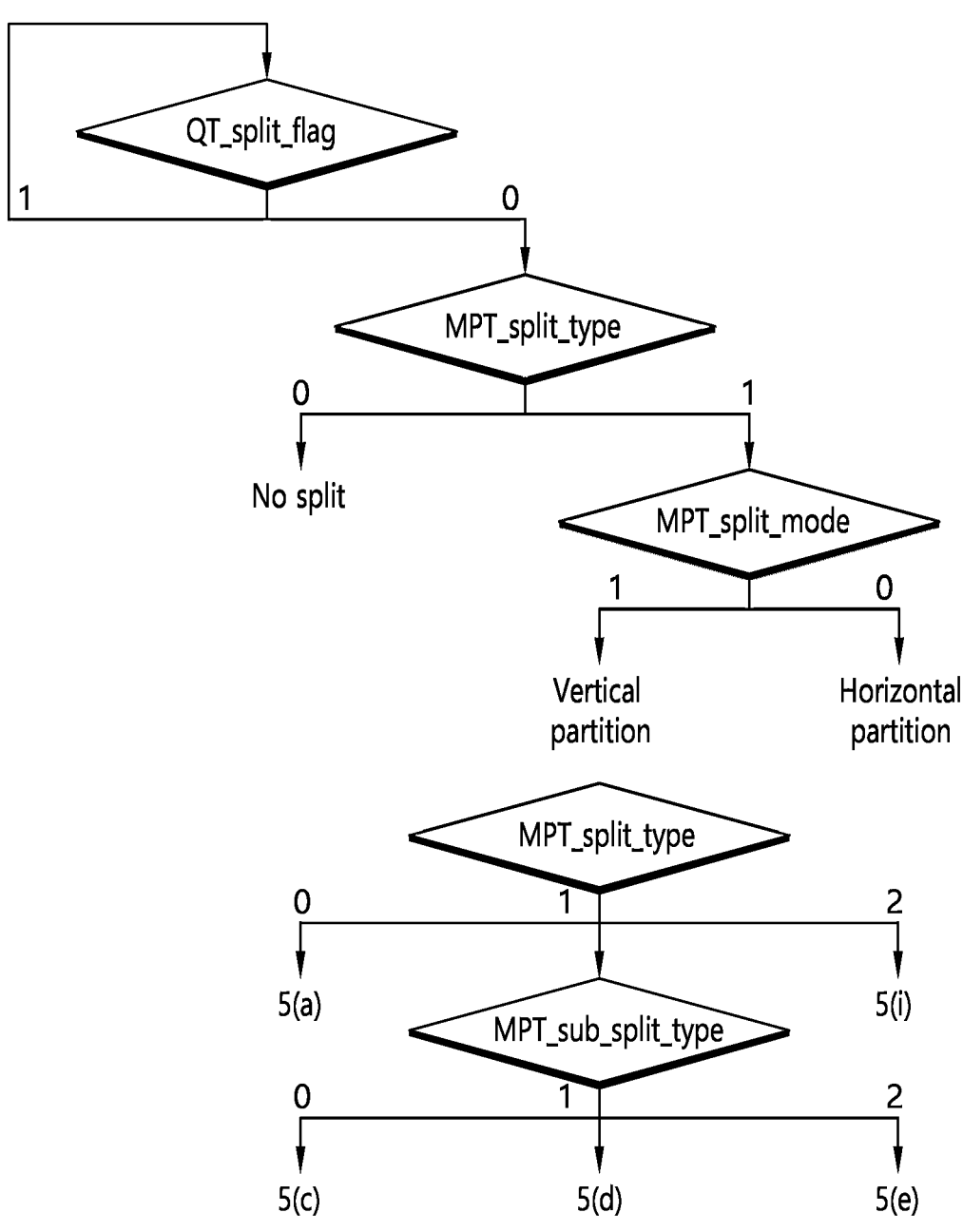
FIG. 7 shows an exemplary transmission of syntaxes of the QTMPT structure for a target CU.

FIG. 7 shows an exemplary transmission of syntaxes of the QTMPT structure for a target CU. As described above in FIG. 6, in case the value of the MPT_split_type is not equal to 0, the MPT_split_mode may be commonly transmitted. However, referring to FIG. 7, the MPT_split_mode may be parsed earlier than the MPT_split_type.

Referring to FIG. 7, a QT_split_flag for a target CU may be transmitted. As described above, the QT_split_flag may indicate whether or not the target CU is split according to the QT structure. More specifically, the QT_split_flag may indicate whether or not the target CU is split to sub-CUs having sizes corresponding to a half height and a half width of the target CU.

More specifically, for example, in case the value of the QT_split_flag of the target CU is equal to 1, i.e., in case the QT_split_flag indicates that the target CU is split to sub-CUs each having a size corresponding to a half height and a half width of the target CU, the target CU may be split to the corresponding sub-CUs. In this case, the QT_split_flag corresponding to the sub-CUs may be transmitted. More specifically, the target CU may be recursively split to lower depth CUs, thereby deriving CUs of terminal nodes, which can no longer be split.

Meanwhile, in case a value of the QT_split_flag for a target CU of the terminal node is equal to 0, i.e., in case the QT_split_flag indicates that the target CU is not split to sub-CUs having sizes corresponding to a half height and a half width of the target CU, the MPT split information may include an MPT split flag for the target CU. More specifically, in case a value of the QT_split_flag for a target CU of the terminal node is equal to 0, an MPT_split_flag for the target CU may be transmitted. The MPT_split_flag may indicate a syntax for the MPT split flag. The MPT_split_flag may indicate whether or not the target CU is split according to the MPT structure. More specifically, for example, the MPT_split_flag may indicate whether or not the 2N×2N size target CU is split to diversely shaped non-square sub-CUs. The non-square sub-CUs may include N/2×2N size sub- CUs, N×2N size sub-CUs, 2N×N/2 size sub-CUs, and/or 2N×N size sub-CUs. In case the value of the MPT_split_flag is equal to 0, the target CU may not be split. Additionally, in case the value of the MPT_split_flag is equal to 1, the target CU may be split according to the MPT structure, and an MPT_split_mode and an MPT_split_type may be transmitted. In case the value of the MPT_split_flag is equal to 1, i.e., in case the target CU is split according to the MPT structure, the shapes of the CUs being split from the target CU may be determined in accordance with the MPT_split_mode and the MPT_split_type.

More specifically, in case the value of the MPT_split_flag is equal to 1, i.e., in case the target CU is split according to the MPT structure, a split direction of the target CU may be derived based on the MPT_split_mode. For example, in case the value of the MPT_split_mode is equal to 1, the target CU may be split along the vertical direction, and, in case the value of the MPT_split_mode is equal to 0, the target CU may be split along the horizontal direction.

Subsequently, a split type of the target CU may be derived based on the MPT_split_type. For example, in case the value of the MPT_split_type is equal to 0, the target CU may be split to 2 sub-CUs. More specifically, in case the value of the MPT_split_mode is equal to 1 and the value of MPT_split_type is equal to 0, the target CU may be split to 2 N×2N size sub-CUs as described above in (a) of FIG. 5. Additionally, in case the value of the MPT_split_mode is equal to 0 and the value of MPT_split_type is equal to 0, the target CU may be split to 2 2N×N size sub-CUs as described above in (b) of FIG. 5.

Additionally, as another example, in case the value of the MPT_split_type is equal to 1, the target CU may be split to 3 sub-CUs. In case the value of the MPT_split_type is equal to 1, i.e., in case the target CU is split to 3 sub-CUs, an MPT_sub_split_type for the target CU may be transmitted, and the MPT_sub_split_type may indicate sub split information of the target CU. More specifically, in case the target CU is split to 3 sub-CUs, sub split information of the target CU may be derived based on the MPT_sub_split_type.

More specifically, in case the value of the MPT_split_mode is equal to 1 and the value of the MPT_split_type is equal to 1 and the value of the MPT_sub_split_type is equal to 0, the target CU may be split to one N/2×2N size left-side sub-CU, one N×2N size center sub-CU, and one N/2×2N size right-side sub-CU, as described above in (c) of FIG. 5. Additionally, in case the value of the MPT_split_mode is equal to 1 and the value of the MPT_split_type is equal to 1 and the value of the MPT_sub_split_type is equal to 1, the target CU may be split to one N/2×2N size left-side sub-CU, one N/2×2N size center sub-CU, and one N×2N size right-side sub-CU, as described above in (d) of FIG. 5. Additionally, in case the value of the MPT_split_mode is equal to 1 and the value of the MPT_split_type is equal to 1 and the value of the MPT_sub_split_type is equal to 2, the target CU may be split to one N×2N size left-side sub-CU, one N/2×2N size center sub-CU, and one N/2×2N size right-side sub-CU, as described above in (c) of FIG. 5. Additionally, in case the value of the MPT_split_mode is equal to 0 and the value of the MPT_split_type is equal to 1 and the value of the MPT_sub_split_type is equal to 0, the target CU may be split to one 2N×N/2 size upper-side sub-CU, one 2N×N size center sub-CU, and one 2N×N/2 size lower-side sub-CU, as described above in (f) of FIG. 5. Additionally, in case the value of the MPT_split_mode is equal to 0 and the value of the MPT_split_type is equal to 1 and the value of the MPT_sub_split_type is equal to 1, the target CU may be split to one 2N×N/2 size upper-side sub-CU, one 2N×N/2 size center sub-CU, and one 2N×N size lower-side sub-CU, as described above in (g) of FIG. 5. Furthermore, in case the value of the MPT_split_mode is equal to 0 and the value of the MPT_split_type is equal to 1 and the value of the MPT_sub_split_type is equal to 2, the target CU may be split to one 2N×N size upper-side sub-CU, one 2N×N/2 size center sub-CU, and one 2N×N/2 size lower-side sub-CU, as described above in (h) of FIG. 5.

Additionally, as another example, in case the value of the MPT_split_type is equal to 2, the target CU may be split to 4 sub-CUs. More specifically, in case the value of the MPT_split_mode is equal to 1 and the value of the MPT_split_type is equal to 2, the target CU may be split to 4 N/2×2N size sub-CUs, as described above in (i) of FIG. 5. Additionally, in case the value of the MPT_split_mode is equal to 0 and the value of the MPT_split_type is equal to 2, the target CU may be split to 4 2N×N/2 size sub-CUs, as described above in (j) of FIG. 5.

As described above, a number of sub-CUs, which are derived by splitting the target CU, may be derived based on the MPT_split_type. Meanwhile, generally, depending upon the inputted image, a number of partitions to which a block is split, i.e., a case where a split type of a block is generated, may not be the same. More specifically, a ratio (or proportion) of the block split type may vary depending upon the inputted image. For example, a proportion of the block type according to which the block is split to 2 partitions may be high, or a proportion of the block type according to which the block is split to 3 partitions may be high, or a proportion of the block type according to which the block is split to 4 partitions may be high. Accordingly, the coding efficiency may be enhanced by using a binarization method, which allocates a binarization string having a small number of bits to a syntax for a split type having a high proportion.

Accordingly, binarization strings of MPT_slice_type and MPT_sub_slice_type for the above-described split types shown in (a) to (j) of FIG. 5, which are derived based on diverse binarization methods, may be derived as shown below in the following table.

TABLE 2

| | Binarization Method 1 | Binarization Method 2 | Binarization Method 3 |
|---|---|---|---|
| MPT-2 (5(a), 5(b)) | 0 | 00 | 0 |
| MPT-3 type0 (5(c), 5(f)) | 100 | 10 | 10 |
| MPT-3 type1 (5(d), 5(g)) | 1010 | 110 | 1110 |
| MPT-3 type2 (5(e), 5(h)) | 1011 | 111 | 1111 |
| MPT-4 (5(i), 5(j)) | 11 | 01 | 110 |

Herein, MPT-2 indicates a split type according to which a block is split (or partitioned) to 2 sub-blocks, as shown and described above in (a) and (b) of FIG. 5. MPT-3 type0 indicates a split type according to which a block is split (or partitioned) to 3 sub-blocks, as shown and described above in (c) and (f) of FIG. 5, and, herein, MPT-3 type0 indicates that the center sub-block corresponds to a sub-block having a larger size. MPT-3 type1 indicates a split type according to which a block is split (or partitioned) to 3 sub-blocks, as shown and described above in (d) and (g) of FIG. 5, and, herein, MPT-3 type1 indicates that the right-side sub-block or the lower-side sub-block corresponds to a sub-block having a larger size. MPT-3 type2 indicates a split type according to which a block is split (or partitioned) to 3 sub-blocks, as shown and described above in (e) and (h) of FIG. 5, and, herein, MPT-3 type2 indicates that the left-side sub-block or the upper-side sub-block corresponds to a sub-block having a larger size. And, MPT-4 indicates a split type according to which a block is split to 4 sub-blocks, as shown and described above in (i) and (j) of FIG. 5.

Referring to Table 2, Binarization Method 1 may first determine whether or not the split type corresponds to MPT-2. More specifically, in case a first value of a syntax of the acquired information on the MPT structure of the target block is equal to 0, the split type of the target block may be determined as MPT-2.

In case the split type of the target block does not correspond to MPT-2, i.e., in case the first value of the syntax of the information on the MPT structure of the target block is not equal to 0, MPT-3 and MPT-4 may be differentiated from one another based on a second value of the syntax of the information on the MPT structure of the target block. More specifically, in case the second value of the syntax of the information on the MPT structure of the target block is equal to 0, the split type of the target block may be determined as MPT-3. And, in case the second value of the syntax of the information on the MPT structure of the target block is equal to 1, the split type of the target block may be determined as MPT-4. Meanwhile, the syntax may indicate the above-described MPT_split_type. More specifically, according to the Binarization Method 1, in case the MPT_split_type is equal to 0, the split type of the target block may be derived as MPT-2. In case the MPT_split_type is equal to 10, the split type of the target block may be derived as MPT-3. And, in case the MPT_split_type is equal to 11, the split type of the target block may be derived as MPT-4.

Additionally, the split type of the target block is determined as MPT-3, i.e., in case the MPT_split_type is equal to 10, MPT_sub_split_type for the target block may be additionally transmitted. Based on the MPT_sub_split_type, the split type of the target block may be determined as MPT-3 type0, MPT-3 type1, or MPT-3 type2. According to the Binarization Method 1, in case the MPT_sub_split_type is equal to 0, the split type of the target block may be derived as MPT-3 type0. In case the MPT_sub_split_type is equal to 10, the split type of the target block may be derived as MPT-3 type1. And, in case the MPT_sub_split_type is equal to 11, the split type of the target block may be derived as MPT-3 type2. Therefore, according to the Binarization Method 1, in case the split type of the target block corresponds to MPT-3 type0, a binarization string indicating the syntax of the MPT structure of the target block may be indicated as 100. In case the split type of the target block corresponds to MPT-3 type1, a binarization string indicating the syntax of the MPT structure of the target block may be indicated as 1010. In case the split type of the target block corresponds to MPT-3 type2, a binarization string indicating the syntax of the MPT structure of the target block may be indicated as 1011. The Binarization Method 1 may be used in a case where the proportion (or ratio) of blocks having a split type of MPT-2 and the proportion of blocks having a split type of MPT-4 within an inputted image are high. Thus, the coding efficiency may be enhanced.

Additionally, referring to Table 2, Binarization Method 2 may first determine whether the split type corresponds to MPT-2 or MPT-4. More specifically, in case a first value of a syntax of the acquired information on the MPT structure of the target block is equal to 0, the split type of the target block may be determined as MPT-2 or MPT-4. And, in case the first value of the syntax of the acquired information on the MPT structure of the target block is not equal to 0, the split type of the target block may be determined as MPT-3. More specifically, in case the split type of the target block is determined as MPT-2 or MPT-4, i.e., in case the first value of the syntax of the acquired information on the MPT structure of the target block is equal to 0, MPT-2 and MPT-4 may be differentiated from one another based on a second value of the syntax of the information on the MPT structure of the target block. More specifically, in case the second value of the syntax of the information on the MPT structure of the target block is equal to 0, the split type of the target block may be determined as MPT-2. And, in case the second value of the syntax of the information on the MPT structure of the target block is equal to 1, the split type of the target block may be determined as MPT-4. Meanwhile, the syntax may indicate the above-described MPT_split_type. More specifically, according to the Binarization Method 2, in case the MPT_split_type is equal to 00, the split type of the target block may be derived as MPT-2. In case the MPT_split_type is equal to 1, the split type of the target block may be derived as MPT-3. And, in case the MPT_split_type is equal to 01, the split type of the target block may be derived as MPT-4.

Additionally, in case the split type of the target block is determined as MPT-3, i.e., in case the MPT_split_type is equal to 1, MPT_sub_split_type for the target block may be additionally transmitted. Based on the MPT_sub_split_type, the split type of the target block may be determined as MPT-3 type0, MPT-3 type1, or MPT-3 type2. According to the Binarization Method 2, in case the MPT_sub_split_type is equal to 0, the split type of the target block may be derived as MPT-3 type0. In case the MPT_sub_split_type is equal to 10, the split type of the target block may be derived as MPT-3 type1. And, in case the MPT_sub_split_type is equal to 11, the split type of the target block may be derived as MPT-3 type2. Therefore, according to the Binarization Method 2, in case the split type of the target block corresponds to MPT-3 type0, a binarization string indicating the syntax of the MPT structure of the target block may be indicated as 10. In case the split type of the target block corresponds to MPT-3 type1, a binarization string indicating the syntax of the MPT structure of the target block may be indicated as 110. In case the split type of the target block corresponds to MPT-3 type2, a binarization string indicating the syntax of the MPT structure of the target block may be indicated as 111. The Binarization Method 2 may be used in a case where the proportion (or ratio) of blocks having a split type of MPT-3 is higher than the proportion of blocks having a split type of MPT-2 within an inputted image. Thus, the coding efficiency may be enhanced.

Furthermore, referring to Table 2, Binarization Method 3 may first determine whether or not the split type corresponds to MPT-2. For example, in case a first value of a syntax of the acquired information on the MPT structure of the target block is equal to 0, the split type of the target block may be determined as MPT-2.

In case the split type of the target block does not correspond to MPT-2, i.e., in case the first value of the syntax of the acquired information on the MPT structure of the target block is not equal to 0, based on a second value of the syntax of the acquired information on the MPT structure of the target block, it may be determined whether or not the split type of the target block corresponds to MPT-3 type0. For example, in case the second value of the syntax of the acquired information on the MPT structure of the target block is equal to 0, the split type of the target block may be determined as MPT-3 type0.

In case the split type of the target block does not correspond to MPT-3 type0, i.e., in case the second value of the syntax of the acquired information on the MPT structure of the target block is not equal to 0, based on a third value of the syntax of the information on the MPT structure of the target block, it may be determined whether or not the split type of the target block corresponds to MPT-4. For example, in case the third value of the syntax of the acquired information on the MPT structure of the target block is equal to 0, the split type of the target block may be determined as MPT-4.

In case the split type of the target block does not correspond to MPT-4, i.e., in case the third value of the syntax of the acquired information on the MPT structure of the target block is not equal to 0, based on remaining values of the syntax of the information on the MPT structure of the target block, it may be determined whether the split type of the target block corresponds to MPT-3 type1 or MPT-3 type2. For example, in case the remaining values of the syntax of the acquired information on the MPT structure of the target block are equal to 10, the split type of the target block may be determined as MPT-3 type1. And, in case the remaining values of the syntax of the acquired information on the MPT structure of the target block are equal to 11, the split type of the target block may be determined as MPT-3 type2. The Binarization Method 3 may be used in a case where the proportion (or ratio) of blocks having a split type of MPT-3 type0 is higher than the proportion of blocks having a split type of MPT-4 within an inputted image. Thus, the coding efficiency may be enhanced.

Meanwhile, the binarization method of the information indicating the split type of the target block according to the MPT structure may be adaptively selected in units of a Sequence Parameter Set (SPS), a Picture Parameter Set (PPS), a slice or a block, and so on, and transmission may be performed in units of the SPS, PPS, slice or block, and so on. Alternatively, the binarization method of the information indicating the split type of the target block according to the MPT structure may be adaptively derived in slice or block units.

Alternatively, as another example, whether or not splitting is performed on a target block according to MPT may first be determined. In this case, a binarization string indicating MPT split (or partitioning) information may be derived as shown below in the following table.

TABLE 3

| | Binarization Method 1 | Binarization Method 2 | Binarization Method 3 |
|---|---|---|---|
| No split | 0 | 0 | 0 |
| MPT-2 (5(a), 5(b)) | 1 0 | 1 00 | 1 0 |
| MPT-3 type0 (5(c), 5(f)) | 1 10 0 | 1 10 | 1 10 |
| MPT-3 type1 (5(d), 5(g)) | 1 10 10 | 1 11 0 | 1 11 10 |
| MPT-3 type2 (5(e), 5(h)) | 1 10 11 | 1 11 1 | 1 11 11 |
| MPT-4 (5(i), 5(j)) | 1 11 | 1 01 | 1 11 0 |

Herein, MPT-2 indicates a split type according to which a block is split (or partitioned) to 2 sub-blocks, as shown and described above in (a) and (b) of FIG. 5. MPT-3 type0 indicates a split type according to which a block is split (or partitioned) to 3 sub-blocks, as shown and described above in (c) and (f) of FIG. 5, and, herein, MPT-3 type0 indicates that the center sub-block has a larger size. MPT-3 type1 indicates a split type according to which a block is split (or partitioned) to 3 sub-blocks, as shown and described above in (d) and (g) of FIG. 5, and, herein, MPT-3 type1 indicates that the right-side sub-block or the lower-side sub-block has a larger size. MPT-3 type2 indicates a split type according to which a block is split (or partitioned) to 3 sub-blocks, as shown and described above in (e) and (h) of FIG. 5, and, herein, MPT-3 type2 indicates that the left-side sub-block or the upper-side sub-block has a larger size. And, MPT-4 indicates a split type according to which a block is split to 4 sub-blocks, as shown and described above in (i) and (j) of FIG. 5.

Referring to Binarization Method 1 of Table 3, it may first be determined whether or not splitting (or partitioning) is performed according to MPT. More specifically, in case a first value of a syntax of the acquired information on the MPT structure of the target block is equal to 0, the target block may not be split according to the MPT.

In case the target block is split according to the MPT, i.e., in case the first value of the syntax of the information on the MPT structure of the target block is not equal to 0, it may be determined whether or not the split type corresponds to MPT-2 based on a second value of the syntax of the information on the MPT structure of the target block. More specifically, in case the second value of the syntax of the acquired information on the MPT structure of the target block is equal to 0, the split type of the target block may be determined as MPT-2.

In case the split type of the target block does not correspond to MPT-2, i.e., in case the second value of the syntax of the information on the MPT structure of the target block is not equal to 0, MPT-3 and MPT-4 may be differentiated from one another based on a third value of the syntax of the information on the MPT structure of the target block. More specifically, in case the third value of the syntax of the information on the MPT structure of the target block is equal to 0, the split type of the target block may be determined as MPT-3. And, in case the third value of the syntax of the information on the MPT structure of the target block is equal to 1, the split type of the target block may be determined as MPT-4. Meanwhile, the syntax may indicate the above-described MPT_split_type. More specifically, according to the Binarization Method 1, in case the MPT_split_type is equal to 10, the split type of the target block may be derived as MPT-2. In case the MPT_split_type is equal to 110, the split type of the target block may be derived as MPT-3. And, in case the MPT_split_type is equal to 111, the split type of the target block may be derived as MPT-4.

Additionally, the split type of the target block is determined as MPT-3, i.e., in case the MPT_split_type is equal to 110, MPT_sub_split_type for the target block may be additionally transmitted. Based on the MPT_sub_split_type, the split type of the target block may be determined as MPT-3 type0, MPT-3 type1, or MPT-3 type2. According to the Binarization Method 1, in case the MPT_sub_split_type is equal to 0, the split type of the target block may be derived as MPT-3 type0. In case the MPT_sub_split_type is equal to 10, the split type of the target block may be derived as MPT-3 type1. And, in case the MPT_sub_split_type is equal to 11, the split type of the target block may be derived as MPT-3 type2. Therefore, according to the Binarization Method 1, in case the split type of the target block corresponds to MPT-3 type0, a binarization string indicating the syntax of the MPT structure of the target block may be indicated as 1100. In case the split type of the target block corresponds to MPT-3 type1, a binarization string indicating the syntax of the MPT structure of the target block may be indicated as 11010. In case the split type of the target block corresponds to MPT-3 type2, a binarization string indicating the syntax of the MPT structure of the target block may be indicated as 11011. The Binarization Method 1 may be used in a case where the proportion (or ratio) of blocks having a split type of MPT-2 and the proportion of blocks having a split type of MPT-4 within an inputted image are high. Thus, the coding efficiency may be enhanced.

Additionally, referring to Binarization Method 2 of Table 3, it may first be determined whether or not splitting (or partitioning) is performed according to MPT. More specifically, in case a first value of a syntax of the acquired information on the MPT structure of the target block is equal to 0, the target block may not be split according to the MPT.

In case the target block is split according to the MPT, i.e., in case the first value of the syntax of the information on the MPT structure of the target block is not equal to 0, it may first be determined whether the split type corresponds to MPT-2 or MPT-4 based on the second value of the syntax of the information on the MPT structure of the target block. More specifically, in case the second value of the syntax of the acquired information on the MPT structure of the target block is equal to 0, the split type of the target block may be determined as MPT-2 or MPT-4. And, in case the second value of the syntax of the acquired information on the MPT structure of the target block is not equal to 0, the split type of the target block may be determined as MPT-3. More specifically, in case the split type of the target block is determined as MPT-2 or MPT-4, i.e., in case the second value of the syntax of the information on the MPT structure of the target block is equal to 0, MPT-2 and MPT-4 may be differentiated from one another based on a third value of the syntax of the information on the MPT structure of the target block. More specifically, in case the third value of the syntax of the information on the MPT structure of the target block is equal to 0, the split type of the target block may be determined as MPT-2. And, in case the third value of the syntax of the information on the MPT structure of the target block is equal to 1, the split type of the target block may be determined as MPT-4. Meanwhile, the syntax may indicate the above-described MPT_split_type. More specifically, according to the Binarization Method 2, in case the MPT_split_type is equal to 100, the split type of the target block may be derived as MPT-2. In case the MPT_split_type is equal to 11, the split type of the target block may be derived as MPT-3. And, in case the MPT_split_type is equal to 101, the split type of the target block may be derived as MPT-4.

Additionally, in case the split type of the target block is determined as MPT-3, i.e., in case the MPT_split_type is equal to 11, MPT_sub_split_type for the target block may be additionally transmitted. Based on the MPT_sub_split_type, the split type of the target block may be determined as MPT-3 type0, MPT-3 type1, or MPT-3 type2. According to the Binarization Method 2, in case the MPT_sub_split_type is equal to 0, the split type of the target block may be derived as MPT-3 type0. In case the MPT_sub_split_type is equal to 10, the split type of the target block may be derived as MPT-3 type1. And, in case the MPT_sub_split_type is equal to 11, the split type of the target block may be derived as MPT-3 type2. Therefore, according to the Binarization Method 2, in case the split type of the target block corresponds to MPT-3 type0, a binarization string indicating the syntax of the MPT structure of the target block may be indicated as 110. In case the split type of the target block corresponds to MPT-3 type1, a binarization string indicating the syntax of the MPT structure of the target block may be indicated as 1110. In case the split type of the target block corresponds to MPT-3 type2, a binarization string indicating the syntax of the MPT structure of the target block may be indicated as 1111. The Binarization Method 2 may be used in a case where the proportion (or ratio) of blocks having a split type of MPT-3 is higher than the proportion of blocks having a split type of MPT-2 within an inputted image. Thus, the coding efficiency may be enhanced.

Furthermore, referring to the Binarization Method 3 of Table 3, it may first be determined whether or not splitting of the target block is performed according to the MPT. More specifically, in case a first value of the syntax of the acquired information on the MPT structure of the target block is equal to 0, the target block may not be split according to the MPT.

In case the target block is split according to the MPT, i.e., in case a first value of the syntax of the acquired information on the MPT structure of the target block is not equal to 0, it may first be determined whether or not the split type corresponds to MPT-2 based on a second value of the syntax of the information on the MPT structure of the target block. For example, in case the second value of the syntax of the acquired information on the MPT structure of the target block is equal to 0, the split type of the target block may be determined as MPT-2.

In case the split type of the target block does not correspond to MPT-2, i.e., in case the second value of the syntax of the acquired information on the MPT structure of the target block is not equal to 0, based on a third value of the syntax of the acquired information on the MPT structure of the target block, it may be determined whether or not the split type of the target block corresponds to MPT-3 type0. For example, in case the third value of the syntax of the acquired information on the MPT structure of the target block is equal to 0, the split type of the target block may be determined as MPT-3 type0.

In case the split type of the target block does not correspond to MPT-3 type0, i.e., in case the third value of the syntax of the acquired information on the MPT structure of the target block is not equal to 0, based on a fourth value of the syntax of the information on the MPT structure of the target block, it may be determined whether or not the split type of the target block corresponds to MPT-4. For example, in case the fourth value of the syntax of the acquired information on the MPT structure of the target block is equal to 0, the split type of the target block may be determined as MPT-4.

In case the split type of the target block does not correspond to MPT-4, i.e., in case the fourth value of the syntax of the acquired information on the MPT structure of the target block is not equal to 0, based on remaining values of the syntax of the information on the MPT structure of the target block, it may be determined whether the split type of the target block corresponds to MPT-3 type1 or MPT-3 type2. For example, in case the remaining values of the syntax of the acquired information on the MPT structure of the target block are equal to 10, the split type of the target block may be determined as MPT-3 type1. And, in case the remaining values of the syntax of the acquired information on the MPT structure of the target block are equal to 11, the split type of the target block may be determined as MPT-3 type2. The Binarization Method 3 may be used in a case where the proportion (or ratio) of blocks having a split type of MPT-3 type0 is higher than the proportion of blocks having a split type of MPT-4 within an inputted image. Thus, the coding efficiency may be enhanced.

Meanwhile, the binarization method of the information indicating the split type of the target block according to the MPT structure may be adaptively selected in units of a Sequence Parameter Set (SPS), a Picture Parameter Set (PPS), a slice or a block, and so on, and transmission may be performed in units of the SPS, PPS, slice or block, and so on. Alternatively, the binarization method of the information indicating the split type of the target block according to the MPT structure may be adaptively derived in slice or block units.

Alternatively, among the above-described split types, an MPT structure using only MPT-2, MPT-3 type0, and MPT-4 and excluding MPT-3 type1 and MPT-3 type2 may be applied. In this case, binarization strings of MPT_slice_type and MPT_sub_slice_type for the split types may be derived as shown below in the following table.

TABLE 4

| | Binarization Method 4 | Binarization Method 5 | Binarization Method 6 |
|---|---|---|---|
| MPT-2 (5(a), 5(b)) | 0 | 10 | 10 |
| MPT-3 type0 (5(c), 5(f)) | 10 | 0 | 11 |
| MPT-4 (5(i), 5(j)) | 11 | 11 | 0 |

Herein, MPT-2 indicates a split type according to which a block is split (or partitioned) to 2 sub-blocks, as shown and described above in (a) and (b) of FIG. 5. MPT-3 type0 indicates a split type according to which a block is split (or partitioned) to 3 sub-blocks, as shown and described above in (c) and (f) of FIG. 5, and, herein, MPT-3 type0 indicates that the center sub-block has a larger size. And, MPT-4 indicates a split type according to which a block is split to 4 sub-blocks, as shown and described above in (i) and (j) of FIG. 5.

Referring to Binarization Method 4 of Table 4, it may first be determined whether or not the split type of the target block corresponds to MPT-2. More specifically, in case a first value of a syntax of the acquired information on the MPT structure of the target block is equal to 0, the split type of the target block may be determined as MPT-2.

In case the split type of the target block does not correspond to MPT-2, i.e., in case the first value of the syntax of the information on the MPT structure of the target block is not equal to 0, MPT-3 type0 and MPT-4 may be differentiated from one another based on a second value of the syntax of the information on the MPT structure of the target block. More specifically, in case the second value of the syntax of the information on the MPT structure of the target block is equal to 0, the split type of the target block may be determined as MPT-3 type0. And, in case the second value of the syntax of the information on the MPT structure of the target block is equal to 1, the split type of the target block may be determined as MPT-4. Meanwhile, the syntax may indicate the above-described MPT_split_type. More specifically, according to the Binarization Method 4, in case the MPT_split_type is equal to 0, the split type of the target block may be derived as MPT-2. In case the MPT_split_type is equal to 10, the split type of the target block may be derived as MPT-3 type0. And, in case the MPT_split_type is equal to 11, the split type of the target block may be derived as MPT-4. The Binarization Method 4 may be used in a case where the proportion (or ratio) of blocks having a split type of MPT-2 is high within an inputted image. Thus, the coding efficiency may be enhanced.

Additionally, referring to Binarization Method 5 of Table 4, it may first be determined whether or not the split type of the target block corresponds to MPT-3 type0. More specifically, in case a first value of a syntax of the acquired information on the MPT structure of the target block is equal to 0, the split type of the target block may be determined as MPT-3 type0.

In case the split type of the target block does not correspond to MPT-3 type0, i.e., in case the first value of the syntax of the information on the MPT structure of the target block is not equal to 0, MPT-2 and MPT-4 may be differentiated from one another based on a second value of the syntax of the information on the MPT structure of the target block. More specifically, in case the second value of the syntax of the information on the MPT structure of the target block is equal to 0, the split type of the target block may be determined as MPT-2. And, in case the second value of the syntax of the information on the MPT structure of the target block is equal to 1, the split type of the target block may be determined as MPT-4. Meanwhile, the syntax may indicate the above-described MPT_split_type. More specifically, according to the Binarization Method 5, in case the MPT-_split_type is equal to 0, the split type of the target block may be derived as MPT-3 type0. In case the MPT_split_type is equal to 10, the split type of the target block may be derived as MPT-2. And, in case the MPT_split_type is equal to 11, the split type of the target block may be derived as MPT-4. The Binarization Method 5 may be used in a case where the proportion (or ratio) of blocks having a split type of MPT-3 type0 is high within an inputted image. Thus, the coding efficiency may be enhanced.

Additionally, referring to Binarization Method 6 of Table 4, it may first be determined whether or not the split type of the target block corresponds to MPT-4. More specifically, in case a first value of a syntax of the acquired information on the MPT structure of the target block is equal to 0, the split type of the target block may be determined as MPT-4.

In case the split type of the target block does not correspond to MPT-4, i.e., in case the first value of the syntax of the information on the MPT structure of the target block is not equal to 0, MPT-2 and MPT-3 type0 may be differentiated from one another based on a second value of the syntax of the information on the MPT structure of the target block. More specifically, in case the second value of the syntax of the information on the MPT structure of the target block is equal to 0, the split type of the target block may be determined as MPT-2. And, in case the second value of the syntax of the information on the MPT structure of the target block is equal to 1, the split type of the target block may be determined as MPT-3 type0. Meanwhile, the syntax may indicate the above-described MPT_split_type. More specifically, according to the Binarization Method 6, in case the MPT_split_type is equal to 0, the split type of the target block may be derived as MPT-4. In case the MPT_split_type is equal to 10, the split type of the target block may be derived as MPT-2. And, in case the MPT_split_type is equal to 11, the split type of the target block may be derived as MPT-3 type0. The Binarization Method 6 may be used in a case where the proportion (or ratio) of blocks having a split type of MPT-4 is high within an inputted image. Thus, the coding efficiency may be enhanced.

Meanwhile, the binarization method of the information indicating the split type of the target block according to the MPT structure may be adaptively selected in units of a Sequence Parameter Set (SPS), a Picture Parameter Set (PPS), a slice or a block, and so on, and transmission may be performed in units of the SPS, PPS, slice or block, and so on. Alternatively, the binarization method of the information indicating the split type of the target block according to the MPT structure may be adaptively derived in slice or block units.

Alternatively, as another example, binarization strings of MPT_slice_type and MPT_sub_slice_type for the split types may be derived as shown below in the following table.

TABLE 5

| | Binarization Method 4 | Binarization Method 5 | Binarization Method 6 |
|---|---|---|---|
| No split | 0 | 0 | 0 |
| MPT-2 (5(a), 5(b)) | 1 0 | 1 10 | 1 10 |
| MPT-3 type0 (5(c), 5(f)) | 1 10 | 1 0 | 1 11 |
| MPT-4 (5(i), 5(j)) | 1 11 | 1 11 | 1 0 |

Herein, MPT-2 indicates a split type according to which a block is split (or partitioned) to 2 sub-blocks, as shown and described above in (a) and (b) of FIG. 5. MPT-3 type0 indicates a split type according to which a block is split (or partitioned) to 3 sub-blocks, as shown and described above in (c) and (f) of FIG. 5, and, herein, MPT-3 type0 indicates that the center sub-block has a larger size. And, MPT-4 indicates a split type according to which a block is split to 4 sub-blocks, as shown and described above in (i) and (j) of FIG. 5.

Referring to Binarization Method 4 of Table 5, it may first be determined whether or not splitting (or partitioning) is performed according to MPT. More specifically, in case a first value of a syntax of the acquired information on the MPT structure of the target block is equal to 0, the target block may not be split according to the MPT.

In case the target block is split according to the MPT, i.e., in case a first value of the syntax of the acquired information on the MPT structure of the target block is not equal to 0, it may first be determined whether or not the split type corresponds to MPT-2 based on a second value of the syntax of the information on the MPT structure of the target block. More specifically, in case the second value of the syntax of the acquired information on the MPT structure of the target block is equal to 0, the split type of the target block may be determined as MPT-2.

In case the split type of the target block does not correspond to MPT-2, i.e., in case the second value of the syntax of the information on the MPT structure of the target block is not equal to 0, MPT-3 type0 and MPT-4 may be differentiated from one another based on a third value of the syntax of the information on the MPT structure of the target block. More specifically, in case the third value of the syntax of the information on the MPT structure of the target block is equal to 0, the split type of the target block may be determined as MPT-3 type0. And, in case the third value of the syntax of the information on the MPT structure of the target block is equal to 1, the split type of the target block may be determined as MPT-4. Meanwhile, the syntax may indicate the above-described MPT_split_type. More specifically, according to the Binarization Method 4, in case the MPT_split_type is equal to 10, the split type of the target block may be derived as MPT-2. In case the MPT_split_type is equal to 110, the split type of the target block may be derived as MPT-3 type0. And, in case the MPT_split_type is equal to 111, the split type of the target block may be derived as MPT-4. The Binarization Method 4 may be used in a case where the proportion (or ratio) of blocks having a split type of MPT-2 is high within an inputted image. Thus, the coding efficiency may be enhanced.

Referring to Binarization Method 5 of Table 5, it may first be determined whether or not splitting (or partitioning) is performed according to MPT. More specifically, in case a first value of a syntax of the acquired information on the MPT structure of the target block is equal to 0, the target block may not be split according to the MPT.

In case the target block is split according to the MPT, i.e., in case the first value of the syntax of the information on the MPT structure of the target block is not equal to 0, based on a second value of the syntax of the acquired information on the MPT structure of the target block, it may be determined whether or not the split type of the target block corresponds to MPT-3 type0. More specifically, in case the second value of the syntax of the acquired information on the MPT structure of the target block is equal to 0, the split type of the target block may be determined as MPT-3 type0.

In case the split type of the target block does not correspond to MPT-3 type0, i.e., in case the second value of the syntax of the information on the MPT structure of the target block is not equal to 0, MPT-2 and MPT-4 may be differentiated from one another based on a third value of the syntax of the information on the MPT structure of the target block. More specifically, in case the third value of the syntax of the information on the MPT structure of the target block is equal to 0, the split type of the target block may be determined as MPT-2. And, in case the third value of the syntax of the information on the MPT structure of the target block is equal to 1, the split type of the target block may be determined as MPT-4. Meanwhile, the syntax may indicate the above-described MPT_split_type. More specifically, according to the Binarization Method 5, in case the MPT_split_type is equal to 10, the split type of the target block may be derived as MPT-3 type0. In case the MPT_split_type is equal to 110, the split type of the target block may be derived as MPT-2. And, in case the MPT_split_type is equal to 111, the split type of the target block may be derived as MPT-4. The Binarization Method 5 may be used in a case where the proportion (or ratio) of blocks having a split type of MPT-3 type0 is high within an inputted image. Thus, the coding efficiency may be enhanced.

Efficiency may be Enhanced

Referring to Binarization Method 6 of Table 5, it may first be determined whether or not splitting (or partitioning) is performed according to MPT. More specifically, in case a first value of a syntax of the acquired information on the MPT structure of the target block is equal to 0, the target block may not be split according to the MPT.

In case the target block is split according to the MPT, i.e., in case the first value of the syntax of the information on the MPT structure of the target block is not equal to 0, based on a second value of the syntax of the acquired information on the MPT structure of the target block, it may first be determined whether or not the split type of the target block corresponds to MPT-4. More specifically, in case the second value of the syntax of the acquired information on the MPT structure of the target block is equal to 0, the split type of the target block may be determined as MPT-4.

In case the split type of the target block does not correspond to MPT-4, i.e., in case the second value of the syntax of the acquired information on the MPT structure of the target block is not equal to 0, MPT-2 and MPT-3 type0 may be differentiated from one another based on a third value of the syntax of the information on the MPT structure of the target block. More specifically, in case the third value of the syntax of the acquired information on the MPT structure of the target block is equal to 0, the split type of the target block may be determined as MPT-2. And, in case the third value of the syntax of the acquired information on the MPT structure of the target block is equal to 1, the split type of the target block may be determined as MPT-3 type0. Meanwhile, the syntax may indicate the above-described MPT_split_type. More specifically, according to the Binarization Method 6, in case the MPT_split_type is equal to 10, the split type of the target block may be derived as MPT-4. In case the MPT_split_type is equal to 110, the split type of the target block may be derived as MPT-2. And, in case the MPT_split_type is equal to 111, the split type of the target block may be derived as MPT-3 type0. The Binarization Method 6 may be used in a case where the proportion (or ratio) of blocks having a split type of MPT-4 is high within an inputted image. Thus, the coding efficiency may be enhanced.

Meanwhile, the binarization method of the information indicating the split type of the target block according to the MPT structure may be adaptively selected in units of a Sequence Parameter Set (SPS), a Picture Parameter Set (PPS), a slice or a block, and so on, and transmission may be performed in units of the SPS, PPS, slice or block, and so on. Alternatively, the binarization method of the information indicating the split type of the target block according to the MPT structure may be adaptively derived in slice or block units.

Alternatively, among the above-described split types, an MPT structure using only MPT-2 and MPT-3 type0 may be applied. In this case, binarization strings of MPT_slice_type for the split types may be derived as shown below in the following table.

TABLE 6

| | Binarization Method 7 |
|---|---|
| No split | 0 |
| MPT-2 (3(a), 3(b)) | 1 0 |
| MPT-3 type0 (3(c), 3(f)) | 1 1 |

Herein, MPT-2 indicates a split type according to which a block is split (or partitioned) to 2 sub-blocks, as shown and described above in (a) and (b) of FIG. 5. And, MPT-3 type0 indicates a split type according to which a block is split (or partitioned) to 3 sub-blocks, as shown and described above in (c) and (f) of FIG. 5, and, herein, MPT-3 type0 indicates a split type wherein the center sub-block corresponds to a sub-block having a larger size.

Referring to Binarization Method 7 of Table 6, it may first be determined whether or not splitting (or partitioning) is performed according to MPT. More specifically, in case a first value of a syntax of the acquired information on the MPT structure of the target block is equal to 0, the split type of the target block indicates that MPT split (or partitioning) is not performed.

In case the split type of the target block does not correspond to MPT split, i.e., in case the first value of the syntax of the information on the MPT structure of the target block is not equal to 0, based on a second value of the syntax of the acquired information on the MPT structure of the target block, it may first be determined whether the split type of the target block corresponds to MPT-2 or MPT-3 type0. More specifically, in case the second value of the syntax of the acquired information on the MPT structure of the target block is equal to 0, the split type of the target block may be determined as MPT-2.

In case the split type of the target block does not correspond to MPT-2, i.e., in case the second value of the syntax of the acquired information on the MPT structure of the target block is not equal to 0, the split type of the target block may be determined as MPT-3 type0. Meanwhile, the syntax may indicate the above-described MPT_split_type.

More specifically, according to the Binarization Method 7 of Table 6, in case the MPT_split_type is equal to 10, the split type of the target block may be derived as MPT-2. In case the MPT_split_type is equal to 11, the split type of the target block may be derived as MPT-3 type0.

Figure 8:
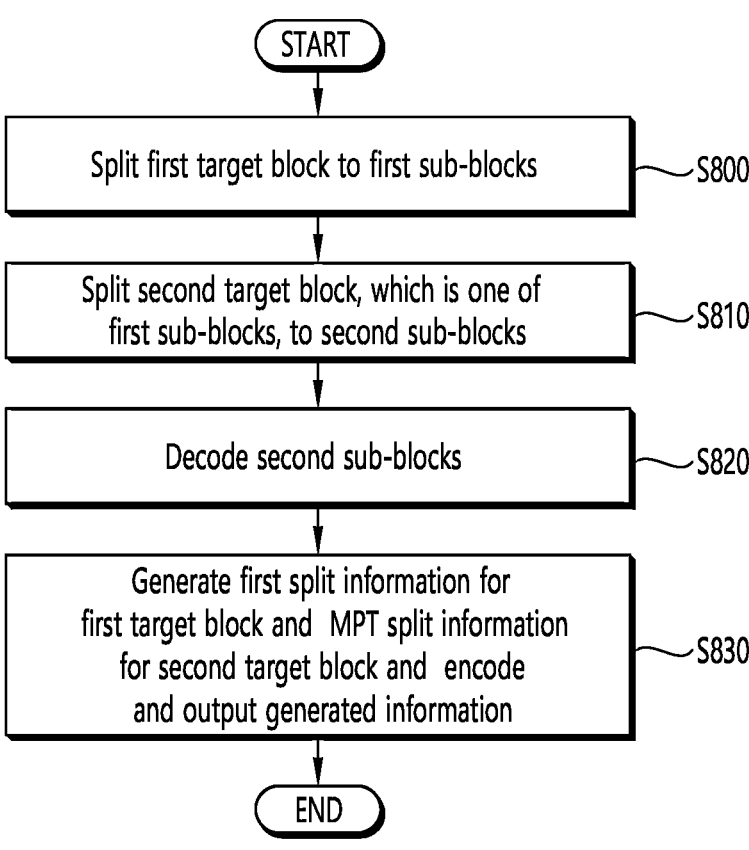
FIG. 8 is a general diagram of a video encoding method performed by an encoding device according to the present discloure.

FIG. 8 is a general diagram of a video encoding method performed by an encoding device according to the present disclosure. The method shown in FIG. 8 may be performed by the encoding device, which is disclosed in FIG. 1. More specifically, for example, steps S800 to S810 of FIG. 8 may be performed by the picture partitioner of the encoding device, step S820 may be performed by the predictor of the encoding device, and step S830 may be performed by the entropy encoder of the encoding device.

The encoding device splits (or partitions) a first target block to first sub-blocks (S800). The encoding device may split the first target block to first sub-blocks according to a Quad Tree (QT) structure. More specifically, for example, the encoding device may split the first target block to 4 first sub-blocks. The first sub-blocks may each have a size corresponding to a half height and a half width of the target block. Meanwhile, the encoding device may generate a Quad Tree (QT) split flag corresponding to the first target block. The QT split flag may indicate whether or not the target block is being split to sub-blocks having a size corresponding to a half height and a half width of the target block.

The encoding device splits a second target block, which is one of the first sub-blocks, to second sub-blocks (S810). The second target block may not be split according to the QT structure. In case the second target block is not split according to the QT structure, the encoding device may split the second target block to second sub-blocks. The second sub-blocks may correspond to non-square blocks.

The second target block may be split to the second sub-blocks according to a Multiple Partitioning Tree (MPT) structure. In this case, the second target block may be split to the second sub-blocks, which correspond to a plurality of diversely shaped non-square blocks. The second target block may be split along a vertical direction or may be split along a horizontal direction.

For example, the second target block may be split to 2, 3, or 4 second sub-blocks along a vertical direction or a horizontal direction according to the MPT split structure. More specifically, in case the size of the second target block corresponds to 2N×2N, the second target block may be split to 2 N×2N size second sub-blocks, 2 2N×N size second sub-blocks, 1 N×2N size second sub-block and 2 N/2×2N size second sub-blocks, 1 2N×N size second sub-block and 2 2N×N/2 size second sub-blocks, 4 N/2×2N size second sub-blocks, or 4 2N×N/2 size second sub-blocks. Herein, in case the second target block is split to 1 N×2N size second sub-block and 2 N/2×2N size second sub-blocks, the N×2N size second sub-block may be derived as a left-side second sub-block, a center second sub-block, or a right-side second sub-block. Additionally, in case the second target block is split to 1 2N×N size second sub-block and 2 2N×N/2 size second sub-blocks, the 2N×N size second sub-block may be derived as an upper-side second sub-block, a center second sub-block, or a lower-side second sub-block. Meanwhile, the encoding device may generate MPT split information indicating an MPT split type of the second target block. A number of bits in a binarization string, which indicates the MPT split information, may be variable based on the split type of the second target block. For example, a binarization string of the MPT split information indicating the split type that is most frequently applied to the blocks, among the split types, within an inputted image (or target picture) may be derived as a binarization string having the smallest number of bits, among the number of bits in a binarization string indicating the split types. A binarization string of the MPT split information that is derived based on the split type may be derived as shown in the above-described Table 2 or Table 3. For example, the binarization string of the MPT split information may be equal to 0, in case the second target block is split to 2 second sub-blocks along the vertical direction or the horizontal direction. The binarization string of the MPT split information may be equal to 100, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 1010, in case the second target block is split to 3 second sub-blocks along the vertical direction or the horizontal direction, wherein the N×2N size or 2N×N size second sub-block corresponds to the center second sub-block. The binarization string of the MPT split information may be equal to 1011, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 11, in case the second target block is split to 4 second sub-blocks along the vertical direction or the horizontal direction. Alternatively, the binarization string of the MPT split information may be equal to 00, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 110, in case the second target block is split to 3 second sub-blocks along the vertical direction or the horizontal direction, wherein the N×2N size or 2N×N size second sub-block corresponds to the center second sub-block. The binarization string of the MPT split information may be equal to 111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 01, in case the second target block is split to 4 second sub-blocks along the vertical direction or the horizontal direction. Alternatively, the binarization string of the MPT split information may be equal to 0, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 1110, in case the second target block is split to 3 second sub-blocks along the vertical direction or the horizontal direction, wherein the N×2N size or 2N×N size second sub-block corresponds to the center second sub-block. The binarization string of the MPT split information may be equal to 1111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 110, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 10, in case the second target block is split to 2 second sub-blocks along the vertical direction or the horizontal direction. The binarization string of the MPT split information may be equal to 1100, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 11010, in case the second target block is split to 3 second sub-blocks along the vertical direction or the horizontal direction, wherein the N×2N size or 2N×N size second sub-block corresponds to the center second sub-block. The binarization string of the MPT split information may be equal to 11011, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 111, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 100, in case the second target block is split to 2 second sub-blocks along the vertical direction or the horizontal direction. The binarization string of the MPT split information may be equal to 110, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 1110, in case the second target block is split to 3 second sub-blocks along the vertical direction or the horizontal direction, wherein the N×2N size or 2N×N size second sub-block corresponds to the center second sub-block. The binarization string of the MPT split information may be equal to 1111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 101, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 10, in case the second target block is split to 2 second sub-blocks along the vertical direction or the horizontal direction. The binarization string of the MPT split information may be equal to 110, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 11110, in case the second target block is split to 3 second sub-blocks along the vertical direction or the horizontal direction, wherein the N×2N size or 2N×N size second sub-block corresponds to the center second sub-block. The binarization string of the MPT split information may be equal to 11111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 1110, in case the second target block is split to 4 second sub-blocks along the vertical direction or the horizontal direction.

Alternatively, as another example, the second target block may be split to 2, 3, or 4 second sub-blocks along a vertical direction or a horizontal direction according to the MPT split structure. More specifically, in case the size of the second target block corresponds to 2N×2N, the second target block may be split to 2 N×2N size second sub-blocks, 2 2N×N size second sub-blocks, 1 N×2N size second sub-block and 2 N/2×2N size second sub-blocks, 1 2N×N size second sub-block and 2 2N×N/2 size second sub-blocks, 4 N/2×2N size second sub-blocks, or 4 2N×N/2 size second sub-blocks. Herein, in case the second target block is split to 1 N×2N size second sub-block and 2 N/2×2N size second sub-blocks, the N×2N size second sub-block may be derived as a center second sub-block. Additionally, in case the second target block is split to 1 2N×N size second sub-block and 2 2N×N/2 size second sub-blocks, the 2N×N size second sub-block may be derived as a center second sub-block. Meanwhile, the encoding device may generate MPT split information indicating an MPT split type of the second target block. A number of bits in a binarization string, which indicates the MPT split information, may be variable based on the split type of the second target block. In this case, for example, a binarization string of the MPT split information that is derived based on the split type may be derived as shown in the above-described Table 4 or Table 5. For example, the binarization string of the MPT split information may be equal to 0, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction. The binarization string of the MPT split information may be equal to 11, in case the second target block is split to 4 second sub-blocks along the vertical direction or the horizontal direction. Alternatively, the binarization string of the MPT split information may be equal to 10, in case the second target block is split to 2 second sub-blocks along the vertical direction or the horizontal direction. The binarization string of the MPT split information may be equal to 0, in case the second target block is split to 3 second sub-blocks along the vertical direction or the horizontal direction. The binarization string of the MPT split information may be equal to 11, in case the second target block is split to 4 second sub-blocks along the vertical direction or the horizontal direction. Alternatively, the binarization string of the MPT split information may be equal to 10, in case the second target block is split to 2 second sub-blocks along the vertical direction or the horizontal direction. The binarization string of the MPT split information may be equal to 11, in case the second target block is split to 3 second sub-blocks along the vertical direction or the horizontal direction. The binarization string of the MPT split information may be equal to 0, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 10, in case the second target block is split to 2 second sub-blocks along the vertical direction or the horizontal direction. The binarization string of the MPT split information may be equal to 110, in case the second target block is split to 3 second sub-blocks along the vertical direction or the horizontal direction. The binarization string of the MPT split information may be equal to 111, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 110, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction. The binarization string of the MPT split information may be equal to 111, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 110, in case the second target block is split to 2 second sub-blocks along the vertical direction or the horizontal direction. The binarization string of the MPT split information may be equal to 111, in case the second target block is split to 3 second sub-blocks along the vertical direction or the horizontal direction. The binarization string of the MPT split information may be equal to 10, in case the second target block is split to 4 second sub-blocks along the vertical direction or the horizontal direction.

Alternatively, as another example, the second target block may be split to 2 or 3 second sub-blocks along a vertical direction or a horizontal direction according to the MPT split structure. More specifically, the second target block may be split to 2 or 3 second sub-blocks along a vertical direction or a horizontal direction based on the MPT split information. Herein, in case the size of the second target block corresponds to 2N×2N and the second target block is split to 2 second sub-blocks along the vertical direction, the second target block may be split to N×2N size second sub-blocks. And, in case the size of the second target block corresponds to 2N×2N and the second target block is split to 2 second sub-blocks along the horizontal direction, the second target block may be split to 2N×N size second sub-blocks. And, in case the size of the second target block corresponds to 2N×2N and the second target block is split to 3 second sub-blocks along the vertical direction, the second target block may be split to one N/2×2N size left-side second sub-block, one N×2N size center second sub-block, and one N/2×2N size right-side second sub-block. And, in case the size of the second target block corresponds to 2N×2N and the second target block is split to 3 second sub-blocks along the horizontal direction, the second target block may be split to one 2N×N/2 size upper-side second sub-block, one 2N×N size center second sub-block, and one 2N×N/2 size lower-side second sub-block. Meanwhile, the encoding device may generate MPT split information indicating an MPT split type of the second target block. A number of bits in a binarization string, which indicates the MPT split information, may be variable based on the split type of the second target block. In this case, for example, a binarization string of the MPT split information that is derived based on the split type may be derived as shown in the above-described Table 6. For example, the binarization string of the MPT split information may be equal to 10, in case the second target block is split to 2 second sub-blocks along the vertical direction or the horizontal direction. And, the binarization string of the MPT split information may be equal to 11, in case the second target block is split to 3 second sub-blocks along the vertical direction or the horizontal direction. Additionally, the binarization string of the MPT split information may be equal to 0, in case the second target block is not split according to the MPT.

The encoding device decodes the second sub-blocks (S820). The encoding device may perform a procedure, such as transform, intra/inter prediction, and so on, on the second sub-blocks and may generate a reconstruction sample corresponding to the second sub-blocks. And, then, the encoding device may generate a reconstruction picture based on the generated reconstruction sample.

The encoding device generates first split information for the first target block and MPT split information for the second target block and encodes and outputs the generated information (S830). The encoding device may encode the first split information and the MPT split information corresponding to the second target block and may output the encoded information through a bitstream, and the bitstream may be stored in a recording medium (a non-transitory computer readable medium). The encoding device may generate the first split information corresponding to the first target block. The first split information may include a Quad Tree (QT) split flag corresponding to the first target block. The QT split flag may indicate whether or not the target block is being split to sub-blocks having a size corresponding to a half height and a half width of the target block. Additionally, the encoding device may generate the second split information corresponding to the second target block, and the second split information may include a QT split flag corresponding to the second target block.

Additionally, the encoding device may generate the MPT split information corresponding to the second target block. Meanwhile, the MPT split information may be generated in case the second target block is split based on the QT split information corresponding to the second target block. More specifically, the MPT split information may be generated in case the second target block is not split according to the QT structure.

For example, the MPT split information may include Multiple Partitioning Tree (MPT) split type information and MPT split direction information corresponding to the second target block. The MPT split type information may indicate a number of the second sub-blocks to which the second target block is split. And, the MPT split direction information may indicate a split direction of the second target block. More specifically, in case a value of the MPT split type information is equal to 0, the MPT split type information may indicate that the second target block is not split. In case the value of the MPT split type information is equal to 1, the MPT split type information may indicate that the number of second sub-blocks is equal to 2. In case the value of the MPT split type information is equal to 2, the MPT split type information may indicate that the number of second sub-blocks is equal to 3. And, in case the value of the MPT split type information is equal to 3, the MPT split type information may indicate that the number of second sub-blocks is equal to 4. Additionally, in case a value of the MPT split direction information is equal to 0, this may indicate that the split direction of the second target block corresponds to a horizontal direction. And, in case the value of the MPT split direction information is equal to 1, this may indicate that the split direction of the second target block corresponds to a vertical direction.

Additionally, in case the number of second sub-blocks indicated by the MPT split type information is equal to 3 and the split direction of the second target block indicated by the MPT split direction information corresponds to the vertical direction, the MPT split information may include MPT sub split type information corresponding to the second target block. In case the number of second sub-blocks indicated by the MPT split type information is equal to 3 and the split direction of the second target block indicated by the MPT split direction information corresponds to the vertical direction, it may be indicated whether the split type of the second target block corresponds to type0, type1, or type2. More specifically, in case the value of the MPT sub split type information is equal to 0, the MPT sub split type information may indicate type0. In case the value of the MPT sub split type information is equal to 1, the MPT sub split type information may indicate type1. In case the value of the MPT sub split type information is equal to 2, the MPT sub split type information may indicate type2. In case the MPT sub split type information indicates type0, among the second sub-blocks, a left-side second sub-block may be derived as the N×2N size second sub-block. In case the MPT sub split type information indicates type1, among the second sub-blocks, a center second sub-block may be derived as the N×2N size second sub-block. In case the MPT sub split type information indicates type2, among the second sub-blocks, a right-side second sub-block may be derived as the N×2N size second sub-block.

Additionally, in case the number of second sub-blocks indicated by the MPT split type information is equal to 3 and the split direction of the second target block indicated by the MPT split direction information corresponds to the horizontal direction, the MPT split information may include MPT sub split type information corresponding to the second target block. In case the number of second sub-blocks indicated by the MPT split type information is equal to 3 and the split direction of the second target block indicated by the MPT split direction information corresponds to the horizontal direction, it may be indicated whether the split type of the second target block corresponds to type0, type1, or type2. More specifically, in case the value of the MPT sub split type information is equal to 0, the MPT sub split type information may indicate type0. In case the value of the MPT sub split type information is equal to 1, the MPT sub split type information may indicate type1. In case the value of the MPT sub split type information is equal to 2, the MPT sub split type information may indicate type2. In case the MPT sub split type information indicates type0, among the second sub-blocks, an upper-side second sub-block may be derived as the 2N×N size second sub-block. In case the MPT sub split type information indicates type1, among the second sub-blocks, a center second sub-block may be derived as the 2N×N size second sub-block. In case the MPT sub split type information indicates type2, among the second sub-blocks, a lower-side second sub-block may be derived as the 2N×N size second sub-block.

Additionally, as another example, the MPT split information may include a Multiple Partitioning Tree (MPT) split flag for the second target block. The MPT split flag may indicate whether or not the second target block is being split to the second sub-blocks, which correspond to non-square blocks. More specifically, in case a value of the MPT split flag is equal to 0, the MPT split flag may indicate that the second target block is not split. And, in case the value of the MPT split flag is equal to 1, the MPT split flag may indicate that the second target block is split to second sub-blocks according to the MPT structure. More specifically, in case the value of the MPT split flag is equal to 1, the MPT split flag may indicate that the second target block is split to second sub-blocks, which correspond to non-square blocks.

Additionally, in case the value of the MPT split flag is equal to 1, the MPT split information may include MPT split direction information and MPT split type information for the second target block. The MPT split direction information may indicate a split direction of the second target block. And, the MPT split type information may indicate a number of the second sub-blocks to which the second target block is split. More specifically, in case the value of the MPT split direction information is equal to 0, this may indicate that the split direction of the second target block corresponds to a horizontal direction. And, in case the value of the MPT split direction information is equal to 1, this may indicate that the split direction of the second target block corresponds to a vertical direction. Additionally, in case the value of the MPT split type information is equal to 0, the MPT split type information may indicate that the number of second sub-blocks is equal to 2. In case the value of the MPT split type information is equal to 1, the MPT split type information may indicate that the number of second sub-blocks is equal to 3. And, in case the value of the MPT split type information is equal to 2, the MPT split type information may indicate that the number of second sub-blocks is equal to 4.

Additionally, in case the number of second sub-blocks indicated by the MPT split type information is equal to 3 and the split direction of the second target block indicated by the MPT split direction information corresponds to the vertical direction, the MPT split information may include MPT sub split type information corresponding to the second target block. In case the number of second sub-blocks indicated by the MPT split type information is equal to 3 and the split direction of the second target block indicated by the MPT split direction information corresponds to the vertical direction, it may be indicated whether the split type of the second target block corresponds to type0, type1, or type2. More specifically, in case the value of the MPT sub split type information is equal to 0, the MPT sub split type information may indicate type0. In case the value of the MPT sub split type information is equal to 1, the MPT sub split type information may indicate type1. In case the value of the MPT sub split type information is equal to 2, the MPT sub split type information may indicate type2. In case the MPT sub split type information indicates type0, among the second sub-blocks, a left-side second sub-block may be derived as the N×2N size second sub-block. In case the MPT sub split type information indicates type1, among the second sub-blocks, a center second sub-block may be derived as the N×2N size second sub-block. In case the MPT sub split type information indicates type2, among the second sub-blocks, a right-side second sub-block may be derived as the N×2N size second sub-block.

Additionally, in case the number of second sub-blocks indicated by the MPT split type information is equal to 3 and the split direction of the second target block indicated by the MPT split direction information corresponds to the horizontal direction, the MPT split information may include MPT sub split type information corresponding to the second target block. In case the number of second sub-blocks indicated by the MPT split type information is equal to 3 and the split direction of the second target block indicated by the MPT split direction information corresponds to the horizontal direction, it may be indicated whether the split type of the second target block corresponds to type0, type1, or type2. More specifically, in case the value of the MPT sub split type information is equal to 0, the MPT sub split type information may indicate type0. In case the value of the MPT sub split type information is equal to 1, the MPT sub split type information may indicate type1. In case the value of the MPT sub split type information is equal to 2, the MPT sub split type information may indicate type2. In case the MPT sub split type information indicates type0, among the second sub-blocks, an upper-side second sub-block may be derived as the 2N×N size second sub-block. In case the MPT sub split type information indicates type1, among the second sub-blocks, a center second sub-block may be derived as the 2N×N size second sub-block. In case the MPT sub split type information indicates type2, among the second sub-blocks, a lower-side second sub-block may be derived as the 2N×N size second sub-block.

Meanwhile, the MPT split information may be signaled via Sequence Parameter Set (SPS), Picture Parameter Set (PPS), or slice segment header, and so on.

Additionally, a number of bits in a binarization string, which indicates the MPT split information, may be variable based on the split type of the second target block. For example, a binarization string of the MPT split information indicating the split type that is most frequently applied to the blocks, among the split types, within an inputted image (or target picture) may be derived as a binarization string having the smallest number of bits, among the number of bits in a binarization string indicating the split types. A binarization string of the MPT split information that is derived based on the split type may be derived as shown in the above-described Table 2, Table 3, Table 4, Table 5, or Table 6. Meanwhile, a bitstream including the MPT split information may be transmitted to the decoding device via network or (digital) storage medium. Herein, the network may include a broadcast network and/or a communication network, and so on, and the digital storage medium may include diverse storage media, such as USB, SD, CD, DVD, Bluray, HDD, SSD, and so on.

FIG. 9 is a general diagram of a video decoding method performed by a decoding device according to the present disclosure. The method shown in FIG. 9 may be performed by the decoding device, which is disclosed in FIG. 2. More specifically, for example, steps S900 and S920 may be performed by the entropy decoder of the decoding device, steps S910 and S930 may be performed by the picture partitioner of the decoding device, and step S940 may be performed by the predictor of the decoding device.

The decoding device acquires first split information for the first target block through a bitstream (S900). The decoding device may acquire the first split information corresponding to the first target block through a bitstream. The first information may include a Quad Tree (QT) split flag corresponding to the first target block. The QT split flag may indicate whether or not the target block is being split to sub-blocks having a size corresponding to a half height and a half width of the target block.

When the first split information represents that the first target block is split, the decoding device splits the first target block to the first sub-blocks (S910). In case the QT split flag, which is included in the first split information, indicates that the first target block is being split, the decoding device may split the first target block to the first sub-blocks. For example, the first target block may be split to 4 first sub-blocks, and the first sub-blocks may correspond to sub-blocks having a size corresponding to a half height and a half width of the target block.

The decoding device acquires MPT split information for a second target block, which is one of the first sub-blocks of the first target block (S920). The decoding device may acquire the MPT split information for the second target block through a bitstream. Additionally, the MPT split information may be signaled via Sequence Parameter Set (SPS), Picture Parameter Set (PPS), or slice segment header, and so on.

The decoding device splits the second target blocks to second sub-blocks based on the MPT split information (S930). The decoding device may split the second target block to second sub-blocks according to a Multiple Partitioning Tree (MPT) split type, which is derived based on the MPT split information. Meanwhile, second split information corresponding to the second target block may be acquired through the bitstream, and, in case the second target block is not split based on the second split information corresponding to the second target block, the second target block may be split to the second sub-blocks based on the MPT split information. More specifically, the second split information may include a QT split flag for the second target block. The MPT split information may be acquired in case the QT split flag corresponding to the second target block indicates that the second target block is not split to sub-blocks having a size corresponding to a half height and a half width of the second target block. More specifically, the MPT split information may be acquired in case the second target block is not split based on the QT split flag corresponding to the second target block.

For example, the second target block may be split to 2, 3, or 4 second sub-blocks along a vertical direction or a horizontal direction based on the MPT split information. More specifically, in case the size of the second target block corresponds to 2N×2N, the second target block may be split to 2 N×2N size second sub-blocks, 2 2N×N size second sub-blocks, 1 N×2N size second sub-block and 2 N/2×2N size second sub-blocks, 1 2N×N size second sub-block and 2 2N×N/2 size second sub-blocks, 4 N/2×2N size second sub-blocks, or 4 2N×N/2 size second sub-blocks. Herein, in case the second target block is split to 1 N×2N size second sub-block and 2 N/2×2N size second sub-blocks, the N×2N size second sub-block may be derived as a left-side second sub-block, a center second sub-block, or a right-side second sub-block. Additionally, in case the second target block is split to 1 2N×N size second sub-block and 2 2N×N/2 size second sub-blocks, the 2N×N size second sub-block may be derived as an upper-side second sub-block, a center second sub-block, or a lower-side second sub-block. Meanwhile, a number of bits in a binarization string, which indicates the MPT split information, may be variable based on the split type of the second target block. For example, a binarization string of the MPT split information indicating the split type that is most frequently applied to the blocks, among the split types, within an inputted image (or target picture) may be derived as a binarization string having the smallest number of bits, among the number of bits in a binarization string indicating the split types. A binarization string of the MPT split information that is derived based on the split type may be derived as shown in the above-described Table 2 or Table 3. For example, the binarization string of the MPT split information may be equal to 0, in case the second target block is split to 2 second sub-blocks along the vertical direction or the horizontal direction. The binarization string of the MPT split information may be equal to 100, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 1010, in case the second target block is split to 3 second sub-blocks along the vertical direction or the horizontal direction, wherein the N×2N size or 2N×N size second sub-block corresponds to the center second sub-block. The binarization string of the MPT split information may be equal to 1011, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 11, in case the second target block is split to 4 second sub-blocks along the vertical direction or the horizontal direction. Alternatively, the binarization string of the MPT split information may be equal to 00, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 110, in case the second target block is split to 3 second sub-blocks along the vertical direction or the horizontal direction, wherein the N×2N size or 2N×N size second sub-block corresponds to the center second sub-block. The binarization string of the MPT split information may be equal to 111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 01, in case the second target block is split to 4 second sub-blocks along the vertical direction or the horizontal direction. Alternatively, the binarization string of the MPT split information may be equal to 0, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 1110, in case the second target block is split to 3 second sub-blocks along the vertical direction or the horizontal direction, wherein the N×2N size or 2N×N size second sub-block corresponds to the center second sub-block. The binarization string of the MPT split information may be equal to 1111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 110, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 10, in case the second target block is split to 2 second sub-blocks along the vertical direction or the horizontal direction. The binarization string of the MPT split information may be equal to 1100, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 11010, in case the second target block is split to 3 second sub-blocks along the vertical direction or the horizontal direction, wherein the N×2N size or 2N×N size second sub-block corresponds to the center second sub-block. The binarization string of the MPT split information may be equal to 11011, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 111, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 100, in case the second target block is split to 2 second sub-blocks along the vertical direction or the horizontal direction. The binarization string of the MPT split information may be equal to 110, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 1110, in case the second target block is split to 3 second sub-blocks along the vertical direction or the horizontal direction, wherein the N×2N size or 2N×N size second sub-block corresponds to the center second sub-block. The binarization string of the MPT split information may be equal to 1111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 101, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 10, in case the second target block is split to 2 second sub-blocks along the vertical direction or the horizontal direction. The binarization string of the MPT split information may be equal to 110, in case the second target block is split to 3 second sub-blocks along the vertical direction or the horizontal direction, wherein the N×2N size or 2N×N size second sub-block corresponds to the left-side or upper-side second sub-block. The binarization string of the MPT split information may be equal to 11110, in case the second target block is split to 3 second sub-blocks along the vertical direction or the horizontal direction, wherein the N×2N size or 2N×N size second sub-block corresponds to the center second sub-block. The binarization string of the MPT split information may be equal to 11111, in case the second target block is split to 3 second sub-blocks along the vertical direction or the horizontal direction, wherein the N×2N size or 2N×N size second sub-block corresponds to the right-side or lower-side second sub-block. The binarization string of the MPT split information may be equal to 1110, in case the second target block is split to 4 second sub-blocks along the vertical direction or the horizontal direction.

Alternatively, as another example, the second target block may be split to 2, 3, or 4 second sub-blocks along a vertical direction or a horizontal direction according to the MPT split structure. More specifically, in case the size of the second target block corresponds to 2N×2N, the second target block may be split to 2 N×2N size second sub-blocks, 2 2N×N size second sub-blocks, 1 N×2N size second sub-block and 2 N/2×2N size second sub-blocks, 1 2N×N size second sub-block and 2 2N×N/2 size second sub-blocks, 4 N/2×2N size second sub-blocks, or 4 2N×N/2 size second sub-blocks. Herein, in case the second target block is split to 1 N×2N size second sub-block and 2 N/2×2N size second sub-blocks, the N×2N size second sub-block may be derived as a center second sub-block. Additionally, in case the second target block is split to 1 2N×N size second sub-block and 2 2N×N/2 size second sub-blocks, the 2N×N size second sub-block may be derived as a center second sub-block. Meanwhile, a number of bits in a binarization string, which indicates the MPT split information, may be variable based on the split type of the second target block. In this case, for example, a binarization string of the MPT split information that is derived based on the split type may be derived as shown in the above-described Table 4 or Table 5. For example, the binarization string of the MPT split information may be equal to 0, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction. The binarization string of the MPT split information may be equal to 11, in case the second target block is split to 4 second sub-blocks along the vertical direction or the horizontal direction. Alternatively, the binarization string of the MPT split information may be equal to 10, in case the second target block is split to 2 second sub-blocks along the vertical direction or the horizontal direction. The binarization string of the MPT split information may be equal to 0, in case the second target block is split to 3 second sub-blocks along the vertical direction or the horizontal direction. The binarization string of the MPT split information may be equal to 11, in case the second target block is split to 4 second sub-blocks along the vertical direction or the horizontal direction. Alternatively, the binarization string of the MPT split information may be equal to 10, in case the second target block is split to 2 second sub-blocks along the vertical direction or the horizontal direction. The binarization string of the MPT split information may be equal to 11, in case the second target block is split to 3 second sub-blocks along the vertical direction or the horizontal direction. The binarization string of the MPT split information may be equal to 0, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 10, in case the second target block is split to 2 second sub-blocks along the vertical direction or the horizontal direction. The binarization string of the MPT split information may be equal to 110, in case the second target block is split to 3 second sub-blocks along the vertical direction or the horizontal direction. The binarization string of the MPT split information may be equal to 111, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 110, in case the second target block is split to 2 second sub-blocks along the vertical direction or the horizontal direction. The binarization string of the MPT split information may be equal to 10, in case the second target block is split to 3 second sub-blocks along the vertical direction or the horizontal direction. The binarization string of the MPT split information may be equal to 111, in case the second target block is split to 4 second sub-blocks along the vertical direction or the horizontal direction. Alternatively, the binarization string of the MPT split information may be equal to 0, in case the second target block is not split according to the MPT. The binarization string of the MPT split information may be equal to 110, in case the second target block is split to 2 second sub-blocks along the vertical direction or the horizontal direction. The binarization string of the MPT split information may be equal to 111, in case the second target block is split to 3 second sub-blocks along the vertical direction or the horizontal direction. The binarization string of the MPT split information may be equal to 10, in case the second target block is split to 4 second sub-blocks along the vertical direction or the horizontal direction.

Alternatively, as another example, the second target block may be split to 2 or 3 second sub-blocks along a vertical direction or a horizontal direction based on the MPT split information. More specifically, the second target block may be split to 2 or 3 second sub-blocks along a vertical direction or a horizontal direction based on the MPT split information. Herein, in case the size of the second target block corresponds to 2N×2N and the second target block is split to 2 second sub-blocks along the vertical direction, the second target block may be split to N×2N size second sub-blocks. And, in case the size of the second target block corresponds to 2N×2N and the second target block is split to 2 second sub-blocks along the horizontal direction, the second target block may be split to 2N×N size second sub-blocks. And, in case the size of the second target block corresponds to 2N×2N and the second target block is split to 3 second sub-blocks along the vertical direction, the second target block may be split to one N/2×2N size left-side second sub-block, one N×2N size center second sub-block, and one N/2×2N size right-side second sub-block. And, in case size of the second target block corresponds to 2N×2N and the second target block is split to 3 second sub-blocks along the horizontal direction, the second target block may be split to one 2N×N/2 size upper-side second sub-block, one 2N×N size center second sub-block, and one 2N×N/2 size lower-side second sub-block. Meanwhile, a number of bits in a binarization string, which indicates the MPT split information, may be variable based on the split type of the second target block. In this case, for example, a binarization string of the MPT split information that is derived based on the split type may be derived as shown in the above-described Table 6. For example, the binarization string of the MPT split information may be equal to 10, in case the second target block is split to 2 second sub-blocks along the vertical direction or the horizontal direction. And, the binarization string of the MPT split information may be equal to 11, in case the second target block is split to 3 second sub-blocks along the vertical direction or the horizontal direction. Additionally, the binarization string of the MPT split information may be equal to 0, in case the second target block is not split according to the MPT.

Meanwhile, the MPT split information may include the following information.

For example, the MPT split information may include Multiple Partitioning Tree (MPT) split type information and MPT split direction information corresponding to the second target block. The MPT split type information may indicate a number of the second sub-blocks to which the second target block is split. And, the MPT split direction information may indicate a split direction of the second target block. More specifically, in case a value of the MPT split type information is equal to 0, the MPT split type information may indicate that the second target block is not split. In case the value of the MPT split type information is equal to 1, the MPT split type information may indicate that the number of second sub-blocks is equal to 2. In case the value of the MPT split type information is equal to 2, the MPT split type information may indicate that the number of second sub-blocks is equal to 3. And, in case the value of the MPT split type information is equal to 3, the MPT split type information may indicate that the number of second sub-blocks is equal to 4. Additionally, in case a value of the MPT split direction information is equal to 0, this may indicate that the split direction of the second target block corresponds to a horizontal direction. And, in case the value of the MPT split direction information is equal to 1, this may indicate that the split direction of the second target block corresponds to a vertical direction. The second target block may be split to the second sub-blocks based on the MPT split information.

Herein, in case the size of the second target block corresponds to 2N×2N and the number of second sub-blocks along indicated by the MPT split information is equal to 2, and, in case the split direction of the second target block indicated by the MPT split direction information corresponds to the vertical direction, the second target block may be split to N×2N size second sub-blocks. And, in case the size of the second target block corresponds to 2N×2N and the number of second sub-blocks along indicated by the MPT split information is equal to 2, and, in case the split direction of the second target block indicated by the MPT split direction information corresponds to the horizontal direction, the second target block may be split to 2N×N size second sub-blocks.

Additionally, as another example, in case the size of the second target block is equal to 2N×2N, and, in case the number of second sub-blocks indicated by the MPT split type information is equal to 3 and the split direction of the second target block indicated by the MPT split direction information corresponds to the vertical direction, the second target block may be split to an N×2N size second sub-block and N/2×2N size second sub-blocks. And, in case the size of the second target block is equal to 2N×2N, and, in case the number of second sub-blocks indicated by the MPT split type information is equal to 3 and the split direction of the second target block indicated by the MPT split direction information corresponds to the horizontal direction, the second target block may be split to a 2N×N size second sub-block and 2N×N/2 size second sub-blocks. In this case, for example, in case the split direction of the second target block indicated by the MPT split direction information corresponds to the vertical direction, among the second sub-blocks, the center second sub-block may be derived as the N×2N size second sub-block. And, in case the split direction of the second target block indicated by the MPT split direction information corresponds to the horizontal direction, among the second sub-blocks, the center second sub-block may be derived as the 2N×N size second sub-block. Meanwhile, in case the size of the second target block is equal to 2N×2N, and, in case the number of second sub-blocks indicated by the MPT split type information is equal to 3, and, in case the split direction of the second target block indicated by the MPT split direction information corresponds to the vertical direction, the MPT split information may include MPT sub split type information. In case the value of the MPT sub split type information is equal to 0, the MPT sub split type information may indicate type0. In case the value of the MPT sub split type information is equal to 1, the MPT sub split type information may indicate type1. And, in case the value of the MPT sub split type information is equal to 2, the MPT sub split type information may indicate type2. In case the MPT sub split type information indicates type0, among the second sub-blocks, the left-side second sub-block may be derived as the N×2N size second sub-block. In case the MPT sub split type information indicates type1, among the second sub-blocks, the center second sub-block may be derived as the N×2N size second sub-block. And, in case the MPT sub split type information indicates type2, among the second sub-blocks, the right-side second sub-block may be derived as the N×2N size second sub-block. Additionally, in case the size of the second target block is equal to 2N×2N, and, in case the number of second sub-blocks indicated by the MPT split type information is equal to 3, and, in case the split direction of the second target block indicated by the MPT split direction information corresponds to the horizontal direction, the MPT split information may include MPT sub split type information. In case the value of the MPT sub split type information is equal to 0, the MPT sub split type information may indicate type0. In case the value of the MPT sub split type information is equal to 1, the MPT sub split type information may indicate type1. And, in case the value of the MPT sub split type information is equal to 2, the MPT sub split type information may indicate type2. In case the MPT sub split type information indicates type0, among the second sub-blocks, the upper-side second sub-block may be derived as the 2N×N size second sub-block. In case the MPT sub split type information indicates type1, among the second sub-blocks, the center second sub-block may be derived as the 2N×N size second sub-block. And, in case the MPT sub split type information indicates type2, among the second sub-blocks, the lower-side second sub-block may be derived as the 2N×N size second sub-block.

Herein, in case the size of the second target block corresponds to 2N×2N and the number of second sub-blocks along indicated by the MPT split information is equal to 4, and, in case the split direction of the second target block indicated by the MPT split direction information corresponds to the vertical direction, the second target block may be split to N/2×2N size second sub-blocks. And, in case the size of the second target block corresponds to 2N×2N and the number of second sub-blocks along indicated by the MPT split information is equal to 4, and, in case the split direction of the second target block indicated by the MPT split direction information corresponds to the horizontal direction, the second target block may be split to 2N×N/2 size second sub-blocks.

Meanwhile, as another example, the MPT split information may include a Multiple Partitioning Tree (MPT) split flag for the second target block. The MPT split flag may indicate whether or not the second target block is being split to the second sub-blocks, which correspond to non-square blocks. More specifically, in case a value of the MPT split flag is equal to 0, the MPT split flag may indicate that the second target block is not split. And, in case the value of the MPT split flag is equal to 1, the MPT split flag may indicate that the second target block is split to second sub-blocks according to the MPT structure. More specifically, in case the value of the MPT split flag is equal to 1, the MPT split flag may indicate that the second target block is split to second sub-blocks, which correspond to non-square blocks.

Additionally, in case the value of the MPT split flag is equal to 1, the MPT split information may include MPT split direction information and MPT split type information for the second target block. The MPT split direction information may indicate a split direction of the second target block. And, the MPT split type information may indicate a number of the second sub-blocks to which the second target block is split. More specifically, in case the value of the MPT split direction information is equal to 0, this may indicate that the split direction of the second target block corresponds to a horizontal direction. And, in case the value of the MPT split direction information is equal to 1, this may indicate that the split direction of the second target block corresponds to a vertical direction. Additionally, in case the value of the MPT split type information is equal to 0, the MPT split type information may indicate that the number of second sub-blocks is equal to 2. In case the value of the MPT split type information is equal to 1, the MPT split type information may indicate that the number of second sub-blocks is equal to 3. And, in case the value of the MPT split type information is equal to 2, the MPT split type information may indicate that the number of second sub-blocks is equal to 4. The second target block may be split to the second sub-blocks based on the MPT split information.

Herein, in case the size of the second target block corresponds to 2N×2N and the number of second sub-blocks along indicated by the MPT split information is equal to 2, and, in case the split direction of the second target block indicated by the MPT split direction information corresponds to the vertical direction, the second target block may be split to N×2N size second sub-blocks. And, in case the size of the second target block corresponds to 2N×2N and the number of second sub-blocks along indicated by the MPT split information is equal to 2, and, in case the split direction of the second target block indicated by the MPT split direction information corresponds to the horizontal direction, the second target block may be split to 2N×N size second sub-blocks.

Additionally, as another example, in case the size of the second target block is equal to 2N×2N, and, in case the number of second sub-blocks indicated by the MPT split type information is equal to 3 and the split direction of the second target block indicated by the MPT split direction information corresponds to the vertical direction, the second target block may be split to an N×2N size second sub-block and N/2×2N size second sub-blocks. And, in case the size of the second target block is equal to 2N×2N, and, in case the number of second sub-blocks indicated by the MPT split type information is equal to 3 and the split direction of the second target block indicated by the MPT split direction information corresponds to the horizontal direction, the second target block may be split to a 2N×N size second sub-block and 2N×N/2 size second sub-blocks. In this case, for example, in case the split direction of the second target block indicated by the MPT split direction information corresponds to the vertical direction, among the second sub-blocks, the center second sub-block may be derived as the N×2N size second sub-block. And, in case the split direction of the second target block indicated by the MPT split direction information corresponds to the horizontal direction, among the second sub-blocks, the center second sub-block may be derived as the 2N×N size second sub-block. Meanwhile, in case the size of the second target block is equal to 2N×2N, and, in case the number of second sub-blocks indicated by the MPT split type information is equal to 3, and, in case the split direction of the second target block indicated by the MPT split direction information corresponds to the vertical direction, the MPT split information may include MPT sub split type information. In case the value of the MPT sub split type information is equal to 0, the MPT sub split type information may indicate type0. In case the value of the MPT sub split type information is equal to 1, the MPT sub split type information may indicate type1. And, in case the value of the MPT sub split type information is equal to 2, the MPT sub split type information may indicate type2. In case the MPT sub split type information indicates type0, among the second sub-blocks, the left-side second sub-block may be derived as the N×2N size second sub-block. In case the MPT sub split type information indicates type1, among the second sub-blocks, the center second sub-block may be derived as the N×2N size second sub-block. And, in case the MPT sub split type information indicates type2, among the second sub-blocks, the right-side second sub-block may be derived as the N×2N size second sub-block. Additionally, in case the size of the second target block is equal to 2N×2N, and, in case the number of second sub-blocks indicated by the MPT split type information is equal to 3, and, in case the split direction of the second target block indicated by the MPT split direction information corresponds to the horizontal direction, the MPT split information may include MPT sub split type information. In case the value of the MPT sub split type information is equal to 0, the MPT sub split type information may indicate type0. In case the value of the MPT sub split type information is equal to 1, the MPT sub split type information may indicate type1. And, in case the value of the MPT sub split type information is equal to 2, the MPT sub split type information may indicate type2. In case the MPT sub split type information indicates type0, among the second sub-blocks, the upper-side second sub-block may be derived as the 2N×N size second sub-block. In case the MPT sub split type information indicates type1, among the second sub-blocks, the center second sub-block may be derived as the 2N×N size second sub-block. And, in case the MPT sub split type information indicates type2, among the second sub-blocks, the lower-side second sub-block may be derived as the 2N×N size second sub-block.

Herein, in case the size of the second target block corresponds to 2N×2N and the number of second sub-blocks along indicated by the MPT split information is equal to 4, and, in case the split direction of the second target block indicated by the MPT split direction information corresponds to the vertical direction, the second target block may be split to N/2×2N size second sub-blocks. And, in case the size of the second target block corresponds to 2N×2N and the number of second sub-blocks along indicated by the MPT split information is equal to 4, and, in case the split direction of the second target block indicated by the MPT split direction information corresponds to the horizontal direction, the second target block may be split to 2N×N/2 size second sub-blocks.

Meanwhile, a number of bits in a binarization string, which indicates the MPT split information, may be variable based on the split type of the second target block. For example, a binarization string of the MPT split information indicating the split type that is most frequently applied to the blocks, among the split types, within an inputted image (or target picture) may be derived as a binarization string having the smallest number of bits, among the number of bits in a binarization string indicating the split types. A binarization string of the MPT split information that is derived based on the split type may be derived as shown in the above-described Table 2, Table 3, Table 4, Table 5, or Table 6.

The decoding device decodes the second sub-blocks (S940). The decoding device may decode the second sub-blocks. More specifically, the decoding device may generate a prediction sample of the second sub-block by performing intra or inter prediction on the second sub-blocks. Thereafter, the decoding device may generate a reconstruction (or recovery) sample corresponding to the second sub-block based on the prediction sample and may then generate a reconstruction picture based on the generated reconstruction sample.

Meanwhile, although it is not shown in the drawing, the decoding device may directly use the prediction sample as a reconstruction (or recovery) sample in accordance with the prediction mode, or the decoding device may generate a reconstruction sample by adding a residual sample to the prediction sample. In case a residual sample for the target block exists, the decoding device may receive information on a residual for the target block, and the information on the residual may include information on the phase. The information on the residual may include transform coefficients corresponding to the residual sample. The decoding device may derive the residual sample (or residual sample array) corresponding to the target block based on the residual information. The decoding device may generate a reconstruction sample based on the prediction sample and the residual sample. And, then, the decoding device may derive a reconstruction block or a reconstruction picture based on the recovery sample. Thereafter, as described above, the decoding device may apply an in-loop filtering procedure, such as deblocking filtering and/or a SAO procedure, to the recovery picture, as needed, in order to enhance subjective/objective picture quality.

According to the above-described present discloure, a picture may be split (or partitioned) to diversely shaped blocks according to a Multiple Partitioning Tree (MPT) structure, and, by doing so, prediction efficiency may be enhanced, and an overall coding efficiency may be enhanced.

Additionally, according to the present discloure, a picture may be split (or partitioned) to diversely shaped blocks according to a Multiple Partitioning Tree (MPT) structure, and by doing so, transform efficiency may be enhanced, and an overall coding efficiency may be enhanced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present discloure described above may be implemented in software. The encoding device and/or decoding device according to the present discloure may be included in a device that performs image processing, for example, for a TV, a computer, a smart phone, a set-top box, or a display device.

When the embodiments of the present discloure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chip-sets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding device, comprising:

obtaining first split information for a first target block from a bitstream;

based on the first split information representing that the first target block is split, splitting the first target block to first sub-blocks;

obtaining Multiple Partitioning Tree (MPT) split information for a second target block from the bitstream, wherein the second target block is one of the first sub-blocks of the first target block;

splitting the second target block to second sub-blocks based on the MPT split information; and decoding the second sub-blocks, wherein the second sub-blocks are non-square blocks, wherein the MPT split information includes a MPT split flag for the second target block, wherein the MPT split flag informs whether the second target block is split to the second sub-blocks that are the non-square blocks, wherein based on a value of the MPT split flag being equal to 1, the MPT split information includes MPT split type information and MPT split direction information for the second target block, wherein the MPT split direction information informs a split direction of the second target block, wherein the MPT split type information informs a number of the second sub-blocks to which the second target block is split, wherein, based on a size of the second target block being 2N×2N and the number of the second sub-blocks informed by the MPT split type information being equal to 3 and the split direction of the second target block informed by the MPT split direction information being a vertical direction, the second target block is split to an N×2N size second sub-block and N/2×2N size second sub-blocks, wherein, based on a size of the second target block being 2N×2N and the number of the second sub-blocks informed by the MPT split type information being equal to 3 and the split direction of the second target block informed by the MPT split direction information being a horizontal direction, the second target block is split to a 2N×N size second sub-block and 2N×N/2 size second sub-blocks, wherein information on MPT structure including a 2 partitions type and a 3 partitions type is obtained through a first High Level Syntax (HLS) and a second HLS, wherein the first HLS is a Sequence Parameter Set (SPS) and the second HLS is a lower syntax structure of the SPS, wherein the 2 partitions type is a type in which a block is split to 2 sub-blocks, wherein the 3 partitions type is a type in which a block is split to 3 sub-blocks, wherein the information on the MPT structure includes information on maximum depth in the MPT structure for an intra slice, information on maximum block size in the MPT structure for the intra slice, information on maximum depth in the MPT structure for an inter slice and information on maximum block size in the MPT structure for the inter slice, wherein the maximum depth in the MPT structure for the intra slice, the maximum block size in the MPT structure for the intra slice, the maximum depth in the MPT structure for the inter slice, the maximum block size in the MPT structure for the inter slice are derived based on the information on the MPT structure, and wherein a process of the splitting the second target block to the second sub-blocks is performed based on the maximum depth in the MPT structure for the intra slice, the maximum block size in the MPT structure for the intra slice, the maximum depth in the MPT structure for the inter slice, the maximum block size in the MPT structure for the inter slice.

2. A video encoding method performed by an encoding device, comprising:

splitting a first target block to first sub-blocks;

splitting a second target block, which is one of the first sub blocks, to second sub-blocks;

generating and encoding first split information for the first target block and Multiple Partitioning Tree (MPT) split information for the second target block, wherein the second sub-blocks are non-square blocks, wherein the MPT split information includes a MPT split flag, MPT split direction information and MPT split type information for the second target block, wherein the MPT split flag informs whether the second target block is split to the second sub-blocks that are the non-square blocks, wherein the MPT split direction information informs a split direction of the second target block, wherein the MPT split type information informs a number of the second sub-blocks to which the second target block is split, wherein, based on a size of the second target block being 2N×2N and the number of the second sub-blocks informed by the MPT split type information being equal to 3 and the split direction of the second target block informed by the MPT split direction information being a vertical direction, the second target block is split to an N×2N size second sub-block and N/2×2N size second sub-blocks, wherein, based on a size of the second target block being 2N×2N and the number of the second sub-blocks informed by the MPT split type information being equal to 3 and the split direction of the second target block informed by the MPT split direction information being a horizontal direction, the second target block is split to a 2N×N size second sub-block and 2N×N/2 size second sub-blocks, wherein information on MPT structure including a 2 partitions type and a 3 partitions type is obtained through a first High Level Syntax (HLS) and a second HLS, wherein the first HLS is a Sequence Parameter Set (SPS) and the second HLS is a lower syntax structure of the SPS, wherein the 2 partitions type is a type in which a block is split to 2 sub-blocks, wherein the 3 partitions type is a type in which a block is split to 3 sub-blocks, wherein the information on the MPT structure includes information on maximum depth in the MPT structure for an intra slice, information on maximum block size in the MPT structure for the intra slice, information on maximum depth in the MPT structure for an inter slice and information on maximum block size in the MPT structure for the inter slice, wherein the maximum depth in the MPT structure for the intra slice, the maximum block size in the MPT structure for the intra slice, the maximum depth in the MPT structure for the inter slice, the maximum block size in the MPT structure for the inter slice are derived based on the information on the MPT structure, and wherein a process of the splitting the second target block to the second sub-blocks is performed based on the maximum depth in the MPT structure for the intra slice, the maximum block size in the MPT structure for the intra slice, the maximum depth in the MPT structure for the inter slice, the maximum block size in the MPT structure for the inter slice.

3. A method of transmitting a bitstream, the method comprising:

generating the bitstream including first split information and Multiple Partitioning Tree (MPT) split information, based on splitting a first target block to first sub-blocks, splitting a second target block, which is one of the first sub blocks, to second sub-block, and generating and encoding the first split information for the first target block and the MPT split information for the second target block;

transmitting the bitstream, wherein the second sub-blocks are non-square blocks, wherein the MPT split information includes a MPT split flag, MPT split direction information and MPT split type information for the second target block, wherein the MPT split flag informs whether the second target block is split to the second sub-blocks that are the non-square blocks, wherein the MPT split direction information informs a split direction of the second target block, wherein the MPT split type information informs a number of the second sub-blocks to which the second target block is split, wherein, based on a size of the second target block being 2N×2N and the number of the second sub-blocks informed by the MPT split type information being equal to 3 and the split direction of the second target block informed by the MPT split direction information being a vertical direction, the second target block is split to an N×2N size second sub-block and N/2×2N size second sub-blocks, wherein, based on a size of the second target block being 2N×2N and the number of the second sub-blocks informed by the MPT split type information being equal to 3 and the split direction of the second target block informed by the MPT split direction information being a horizontal direction, the second target block is split to a 2N×N size second sub-block and 2N×N/2 size second sub-blocks, wherein information on MPT structure including a 2 partitions type and a 3 partitions type is obtained through a first High Level Syntax (HLS) and a second HLS, wherein the first HLS is a Sequence Parameter Set (SPS) and the second HLS is a lower syntax structure of the SPS, wherein the 2 partitions type is a type in which a block is split to 2 sub-blocks, wherein the 3 partitions type is a type in which a block is split to 3 sub-blocks, wherein the information on the MPT structure includes information on maximum depth in the MPT structure for an intra slice, information on maximum block size in the MPT structure for the intra slice, information on maximum depth in the MPT structure for an inter slice and information on maximum block size in the MPT structure for the inter slice, wherein the maximum depth in the MPT structure for the intra slice, the maximum block size in the MPT structure for the intra slice, the maximum depth in the MPT structure for the inter slice, the maximum block size in the MPT structure for the inter slice are derived based on the information on the MPT structure, and wherein a process of the splitting the second target block to the second sub-blocks is performed based on the maximum depth in the MPT structure for the intra slice, the maximum block size in the MPT structure for the intra slice, the maximum depth in the MPT structure for the inter slice, the maximum block size in the MPT structure for the inter slice.

\* \* \* \* \*